United States Patent
Umeda et al.

(10) Patent No.: US 7,773,266 B2
(45) Date of Patent: *Aug. 10, 2010

(54) IMAGE PROCESSING APPARATUS, METHOD, AND COMPUTER PRODUCT FOR ADDING REFERENCE FRAME INFORMATION USED TO DETECT POSITION OF IMAGE EMBEDDED INFORMATION

(75) Inventors: Kiyoshi Umeda, Kanagawa (JP); Nobutaka Miyake, Kanagawa (JP); Minoru Kusakabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 824 days.

This patent is subject to a terminal disclaimer.

(21) Appl. No.: 11/561,552

(22) Filed: Nov. 20, 2006

(65) Prior Publication Data

US 2007/0076262 A1    Apr. 5, 2007

Related U.S. Application Data

(62) Division of application No. 10/255,645, filed on Sep. 27, 2002, now Pat. No. 7,187,476.

(30) Foreign Application Priority Data

Oct. 1, 2001  (JP)  ............................... 2001-305742
Oct. 1, 2001  (JP)  ............................... 2001-305745

(51) Int. Cl.
  G06K 15/02  (2006.01)
  B41M 3/10   (2006.01)
  B41M 3/14   (2006.01)
  H04N 1/387  (2006.01)

(52) U.S. Cl. ...................... 358/3.28; 358/3.03; 358/1.2; 358/1.18

(58) Field of Classification Search ................. 358/1.9, 358/1.2, 3.28, 1.18, 537, 452, 450, 451, 3.03; 382/100, 284, 298, 299; 283/71, 74, 113
See application file for complete search history.

(56) References Cited

U.S. PATENT DOCUMENTS

| | | | |
|---|---|---|---|
| 5,592,305 A * | 1/1997 | Iwadate et al. | 358/450 |
| 5,638,183 A * | 6/1997 | Hayashi et al. | 358/1.9 |
| 5,652,626 A | 7/1997 | Kawakami et al. | |
| 6,222,637 B1 | 4/2001 | Ito et al. | |
| 6,731,774 B1 | 5/2004 | Hosaka et al. | |
| 6,744,905 B1 * | 6/2004 | Horiike | 382/100 |
| 6,753,979 B2 | 6/2004 | Umeda | |

FOREIGN PATENT DOCUMENTS

| | | |
|---|---|---|
| EP | 1 102 474 A2 | 5/2001 |
| JP | 2-35869 | 2/1990 |
| JP | 5-207241 | 8/1993 |
| JP | 7-123244 | 5/1995 |
| JP | 2001-148778 | 5/2001 |

* cited by examiner

*Primary Examiner*—Scott A Rogers
(74) *Attorney, Agent, or Firm*—Fitzpatrick, Cella, Harper & Scinto

(57) ABSTRACT

This invention is an image processing apparatus capable of adding a reference frame for accurately specifying an image region printed on a printing medium. An image forming unit (13) converts an input image for printing into that of a predetermined resolution. An additional information multiplexer (14) embeds additional information in each predetermined region of the resolution-converted image. A reference frame addition unit 15 adds a predetermined reference frame to the perimeter of the image in which the additional information is embedded. A printer (16) prints the image having the additional information embedded in it and the reference frame onto a printing medium, and outputs a printed image (17).

17 Claims, 39 Drawing Sheets

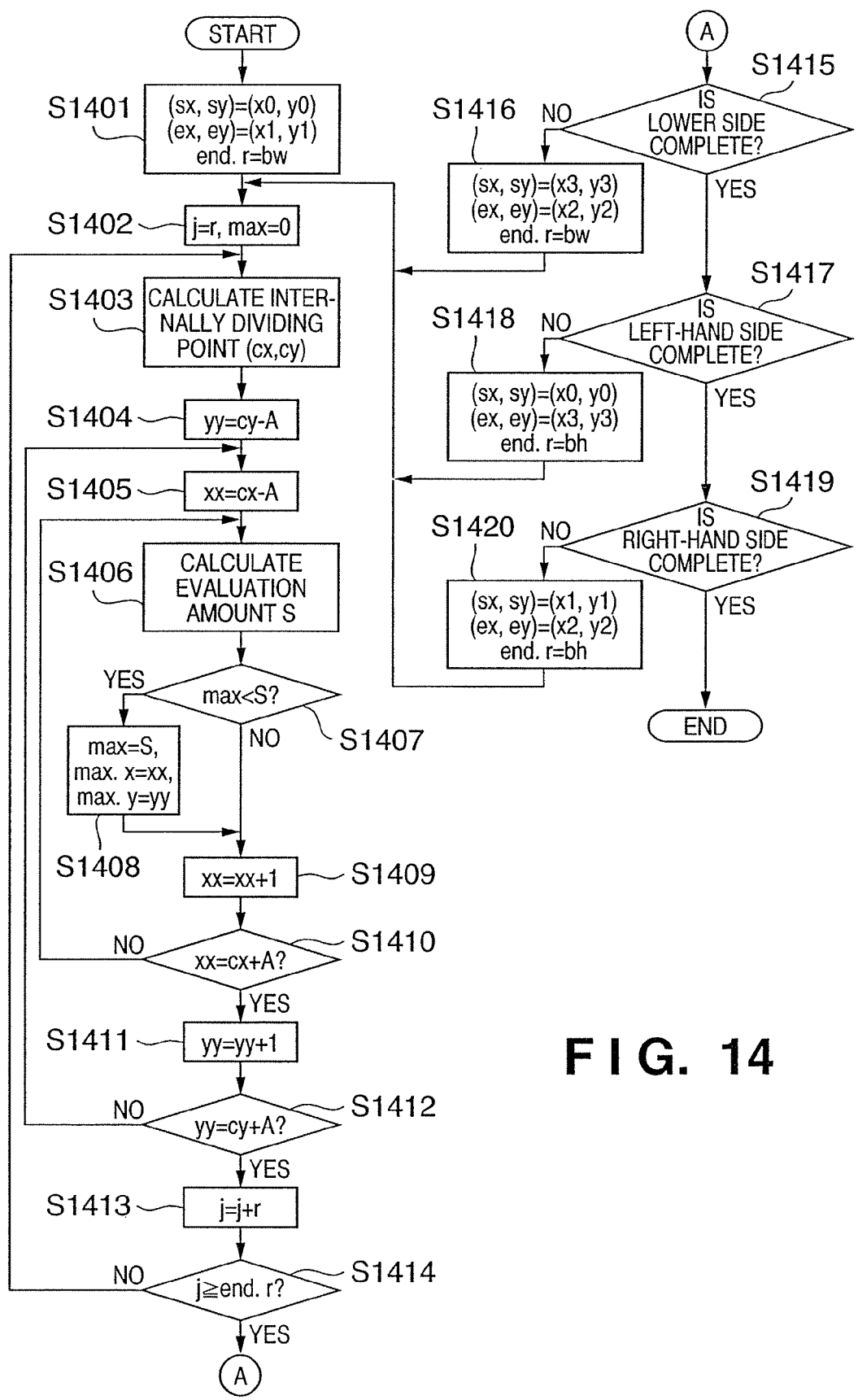
F I G. 14

F I G. 25
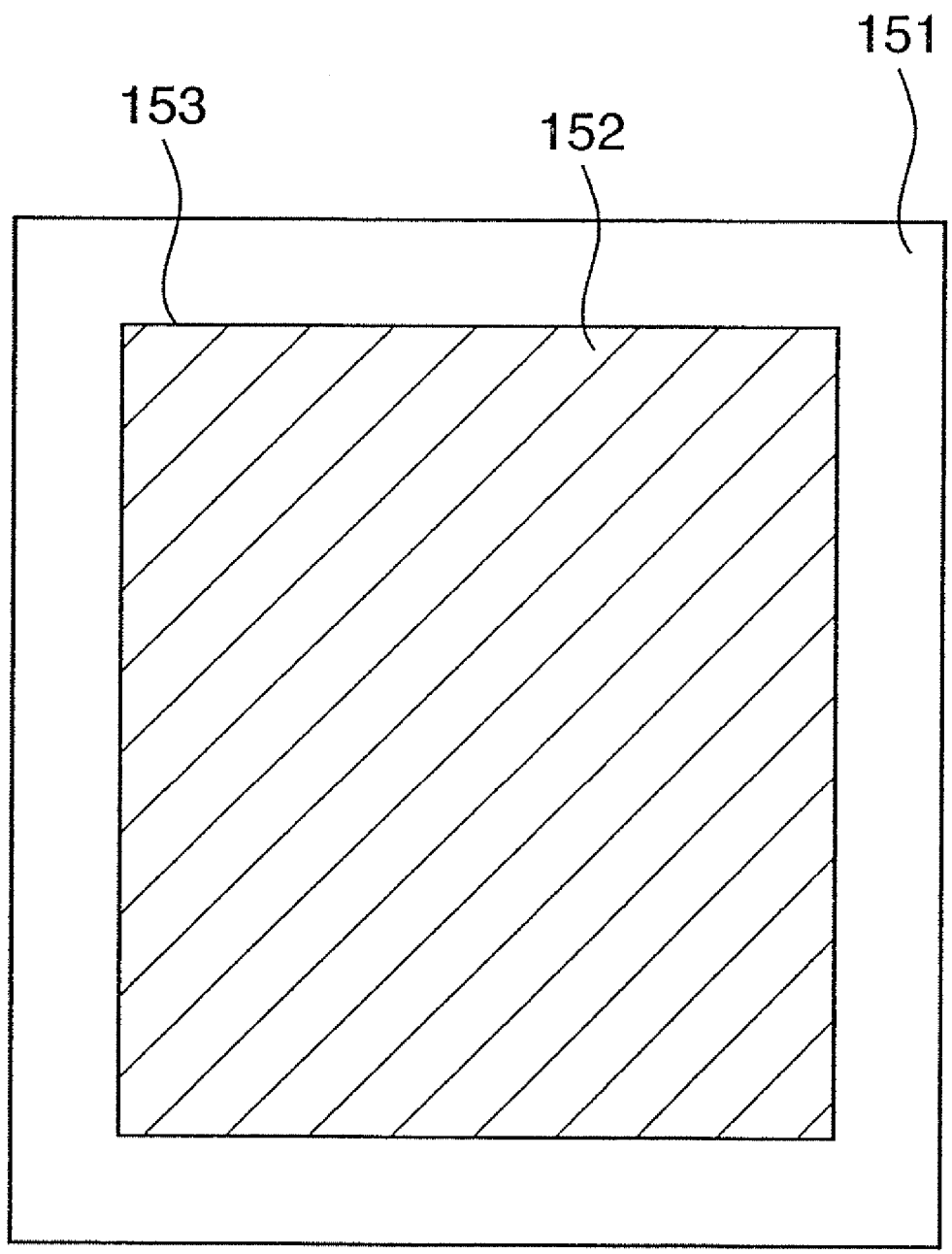

IMAGE PROCESSING APPARATUS, METHOD, AND COMPUTER PRODUCT FOR ADDING REFERENCE FRAME INFORMATION USED TO DETECT POSITION OF IMAGE EMBEDDED INFORMATION

This application is a division of application Ser. No. 10/255,645 filed Sep. 27, 2002, now U.S. Pat. No. 7,187,476.

FIELD OF THE INVENTION

The present invention relates to an image processing apparatus and method, computer program, and recording medium for printing image information by embedding additional information, such as sound information, text document information, information pertaining to the image, and information irrelevant to the image, in the image information such that this additional information is visually inconspicuous. The present invention also relates to an image processing apparatus and method, computer program, and recording medium for restoring or reconstructing embedded additional information from a printing medium on which an image having this additional information, such as sound information, text document information, information pertaining to the image, and information irrelevant to the image, embedded in it is printed.

BACKGROUND OF THE INVENTION

Conventionally, to prevent unauthorized copy and alteration of an image, researches for embedding specific information in the image have been extensively made. This technology is called digital watermark. For example, in a digital image of, e.g., a photograph or picture, additional information such as the name of the copyright holder and the use permission is embedded. Recently, a technology is beginning to be standardized by which additional information is so embedded in an original image as to be visually inconspicuous, and the image is circulated across a network such as the Internet.

Another technology is also being studied which can specify additional information such as the type and machine number of printing device which has printed an image, from a printed product such as paper on which the image is printed. These technologies are used to prevent forgery of, e.g., paper money, stamps, and securities, resulting from improved image quality of image forming apparatuses such as copying machines and printers.

For example, Japanese Patent Laid-Open No. 7-123244 has proposed a technology which embeds additional information in high-frequency regions of a color difference component and saturation component in an image to which humans have low visual sensitivity.

Unfortunately, it is very difficult for the conventional methods as described above to embed sound information and other large-volume information in an image such that these pieces of information are unobtrusive when the image is printed.

As a means for solving this problem, therefore, in Japanese Patent Laid-Open No. 2001-148778 the present applicant has proposed a method which uses a texture generated by error diffusion to artificially form a combination of quantized values which are not generated by normal pseudo halftoning, and embeds the formed code in an image. In this method, only the shape of the texture microscopically changes, so the image quality visually remains almost unchanged from the original image. Also, different types of signals can be multiplexed very easily by changing the quantization threshold value in error diffusion.

A conventional image processing system which prints an arbitrary image by embedding additional information in the image and extracts the embedded image from the printed image will be explained below. FIG. 19 is a block diagram showing the arrangement of a conventional image processing apparatus which embeds additional information in an arbitrary image and outputs the printed image. Referring to FIG. 19, an input terminal 191 inputs given multi-level image information, and an input terminal 192 inputs additional information to be embedded in this image information. This additional information can be the copyright, photographing date/time, photographing location, photographer, and the like pertaining to the input image information from the input terminal 191, or can be sound information, text document information, and the like irrelevant to the image information.

An additional information multiplexer 193 embeds the input additional information from the input terminal 192 into the input image information from the input terminal 191, such that the additional information is visually inconspicuous. That is, this additional information multiplexer 193 segments the input image into given N-pixel square blocks and embeds the additional information in each block.

The image information in which the additional information is embedded by the additional information multiplexer 193 is printed on a printing medium by a printer 194. Note that this printer 194 is, e.g., an inkjet printer or laser printer capable of expressing a tone by using pseudo halftoning.

FIG. 20 is a block diagram showing the arrangement of a conventional image processing apparatus which extracts the embedded additional information from the output printed image from the image processing apparatus shown in FIG. 19. Referring to FIG. 20, the image information printed on the printing medium is read and converted into image data by an image scanner 201. This image data is input to an additional information separator 202.

The additional information separator 202 uses a known image processing method to detect an image region in which the additional information is embedded. A representative method of this detection is to detect the boundary between a non-image region and an image region by a density difference. After thus detecting the image region, the additional information separator 202 separates the embedded additional information from the region. This separated additional information is output from an output terminal 203.

Unfortunately, the above-mentioned conventional method has the following problems.

First, the method of detecting an image region by a density difference in an image cannot detect the boundary of an image region from some image information input from the input terminal 191. FIG. 21 shows an example of a printed image in which the boundary of an image region is unclear. As shown in FIG. 21, in a printed image in which the upper portion of an image region has substantially the same color as the paper color (e.g., white) of a printing medium, the aforementioned method of detecting an image region by a density difference cannot detect the upper boundary line.

Even in this image in which the upper boundary line is obscure, additional information is inconspicuously embedded in the image information, so the image region must be correctly input. However, when trimming the printed image with an image scanner, the user cannot tell the range to be trimmed.

In addition, the conventional method segments an input image into N-pixel square blocks and multiplexes additional information in each block. Therefore, the additional information separator 202 must detect the coordinates of each block with an error of at least about a few pixels. If this error increases, the detection accuracy of additional information significantly lowers, and this makes accurate restoration of the additional information difficult.

Furthermore, image data read by the image scanner 201 is influenced by various error factors. For example, even when a printed image which is set without any skew is read by the image scanner 201, error factors such as expansion or contraction of the printing medium and distortion caused by the driving system or optical system of the image scanner 201 are produced.

Accordingly, Japanese Patent Laid-Open No. 2-35869 is proposed as a method of calculating a skew of an image read by an image scanner or facsimile apparatus. In this invention, a reference line is drawn beforehand in a predetermined portion of an original to be read such that the line is parallel to the original. When the original is read, a skew of this reference line is detected and corrected.

Also, Japanese Patent Laid-Open No. 5-207241 is proposed as a method of detecting a skew and expansion or contraction of an original and the degree of unevenness of paper feed. In this invention, reference marks are printed beforehand in two predetermined portions of an original to be read. When the original is read, the positions of these two reference marks are detected, and the distance between the reference marks are measured. In this manner, a skew and expansion or contraction of the original and the degree of unevenness of paper feed are detected.

These conventionally proposed methods as described above can correct a skew to a certain extent. However, they cannot estimate a specific position in an image region with an error of about a few pixels or less.

In the above-mentioned inventions, input image information is segmented into square blocks each having a certain size (e.g., N×N pixels). Additional information is embedded in the image by microscopically changing the texture in each block in accordance with the bit code of the additional information, and output as a printed image. This additional information can be restored by reading the printed image by an optical reader such as an image scanner, converting the read image into a digital image, and analyzing the frequency component of the texture of the image in each square block of N×N pixels.

Also, when an image in which additional information is embedded by the method as described above is printed and this printed image is read by using an optical reader such as an image scanner, nonlinear distortion is produced in the read image information owing to parts such as a lens and driving system. This distortion conventionally makes it impossible to correctly estimate the position of a square block in which the additional information is embedded in the image, by using only the four apex coordinates of an image region.

The present applicant, therefore, has proposed a method of adding a reference frame when an image is printed. This reference frame is formed around an image region and has a width of one pixel or more. On this frame, gaps of a few pixels are formed at predetermined intervals as image correction marks. After a printed image is read by an optical reader such as an image scanner, these image correction marks are detected from the reference frame, and the position of the read image and the like are corrected. After that, the additional information is restored. This corrects nonlinear distortion generated when an image is read by an optical reader such as an image scanner.

An image processing system previously proposed by the present applicant will be explained below. This image processing system includes an image processing apparatus for embedding additional information in an image and printing the image by adding the reference frame described above, and an image processing apparatus for restoring the embedded additional information from the printed image. FIG. 38 is a block diagram showing the arrangement of the previously proposed image processing apparatus which embeds additional information in an image and prints the image by adding the reference frame.

Referring to FIG. 38, image information D7 input from an input terminal 181 is converted into image information D8 having a size of H (vertical)×W (horizontal) pixels which is the resolution of printing by an image forming unit 183. The values of H and W are fixed to predetermined values beforehand or take values indicated by $$\begin{cases} W = 2Qw \\ H = 2Qh \end{cases}$$

(where w and h are the numbers of pixels in the horizontal and vertical directions, respectively, of image information D5, and Q is a constant larger than the maximum value of read errors of an optical reader such as an image scanner or of errors produced by expansion or contraction of a printing medium, more specifically, a constant which is an integral multiple of N as the dimension of one side of a square block segmented in the image information D7) in order for the image processing apparatus for extracting additional information from a printed image to accurately specify these values. Note that any known method such as nearest neighbor interpolation or linear interpolation can be used as the conversion of image information in the image forming unit 183. The converted image information D8 is input to an additional information multiplexer 184.

This additional information multiplexer 184 embeds in the image information D8 additional information $x_2$ input from an input terminal 182. Image information D9 in which the additional information $x_2$ is thus embedded by the additional information multiplexer 184 is supplied to a reference frame addition unit 185 where information concerning a reference frame for use in image correction is added to the image information. The obtained image information is output as image information D10. This image information D10 is printed on, e.g., a paper sheet as a printing medium by a printer 186, thereby obtaining a printed image 187.

FIG. 39 is a block diagram showing the arrangement of the previously proposed image processing apparatus for reading a printed image and extracting additional information. Referring to FIG. 39, the printed image 187 printed by the image processing apparatus shown in FIG. 38 is read by an image scanner 391 to obtain image information D21. This image information D21 is input to a block position detector 392. The block position detector 392 first obtains the coordinates of the four apexes of an image region which is a rectangular region in the image information D21, and then calculates a dimension W' in the horizontal direction and a dimension H' in the vertical direction of the image region from the distances between these apexes. Owing to optical distortion and the like during reading, the dimensions W' and H' of the image region actually read by the image scanner 391 contain errors a and b as indicated by $$\begin{cases} W' = 2Qw \pm a \\ H' = 2Qh \pm b \end{cases}$$

Since, however, Q is so set as to be larger than the maximum values of these errors a and b, W' and H' can be converted into W and H, respectively, by quantizing W' and H' by 2Q.

In addition, on the basis of the calculated W and H, the block position detector 392 detects the positions of the image correction marks formed on the reference frame, thereby specifying the position of a block in which the additional information $x_2$ is embedded. An additional information separator 393 separates and restores this additional information $x_2$ on the basis of the specified block position information. The restored additional information $x_2$ is output from an output terminal 394.

Unfortunately, the above-mentioned conventional method has the limitation that the image dimensions W and H after size conversion must be integral multiples of 2Q. Also, the constant Q must be larger than the maximum value of read errors caused by optical distortion generated during reading by the image scanner or the like or caused by expansion or contraction of the printing medium.

For example, assume that an image having a size of 2,000×2,000 pixels after conversion is printed by a 600-dpi printer and read by an image scanner for general consumers which has the same resolution of 600 dpi, and additional information is restored from the read image. If the size of the image read by the image scanner contains errors of a maximum of 50 pixels, the image is read as an image within the range of 1,950 to 2,050 pixels in both the vertical and horizontal directions. When the accuracy is like this, adjustment must be performed every 100 pixels in order to convert the size of the image information to be printed by the printer. That is, when a 600-dpi printer is used, image size adjustment can be performed only about every 4 mm. This significantly deteriorates the ease with which the user uses layout editing during printing.

SUMMARY OF THE INVENTION

The present invention has been proposed to solve the conventional problems, and has as its object to provide an image processing apparatus and method, program code, and recording medium capable of adding a reference frame for accurately specifying an image region printed on a printing medium.

To achieve the above object, the present invention is characterized by comprising additional information multiplexing means for embedding additional information in an image, frame adding means for adding a predetermined frame to the perimeter of the image in which the additional information is embedded, and printing means for printing, on a printing medium, the image having the additional information embedded in it and the frame.

It is another object of the present invention to provide an image processing apparatus and method, computer program, and recording medium capable of restoring accurate additional information by calculating an accurate size of an original image on a printing medium, from an image containing distortion generated when this image on the printing medium is optically read.

To achieve the above object, an image processing apparatus according to the present invention is an image processing apparatus comprising optical reading means for optically reading a printing medium on which an image having additional information embedded in it is printed, and separating/restoring means for separating and restoring the additional information from the read image, characterized by further comprising frame detecting means for detecting a frame including reference marks formed at predetermined intervals around an image region printed on the printing medium, apex specifying means for specifying the apexes of the image region on the basis of the detected frame, reference mark detecting means for detecting reference marks between two adjacent apexes in turn from the side of one apex, and image region calculating means for calculating the size of the image on the basis of the detected reference marks.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is a flow chart for explaining the operation procedure of a reference mark detector 52e in this embodiment;

FIG. 25 is a schematic view for explaining the relationship between reference marks and an image region when image information is printed;

FIG. 32 is a view for explaining eight reference points on edges obtained by a reference frame detector 72a;

DETAILED DESCRIPTION OF THE PREFERRED EMBODIMENTS

Preferred embodiments of the present invention will now be described in detail in accordance with the accompanying drawings.

Note that an image processing system according to this embodiment includes two types of image processing apparatuses: an image processing apparatus for printing a reference frame for accurately specifying an image region in which additional information is embedded, and an image processing apparatus for extracting the embedded additional information from the printed image.

First Embodiment

Figure 1:
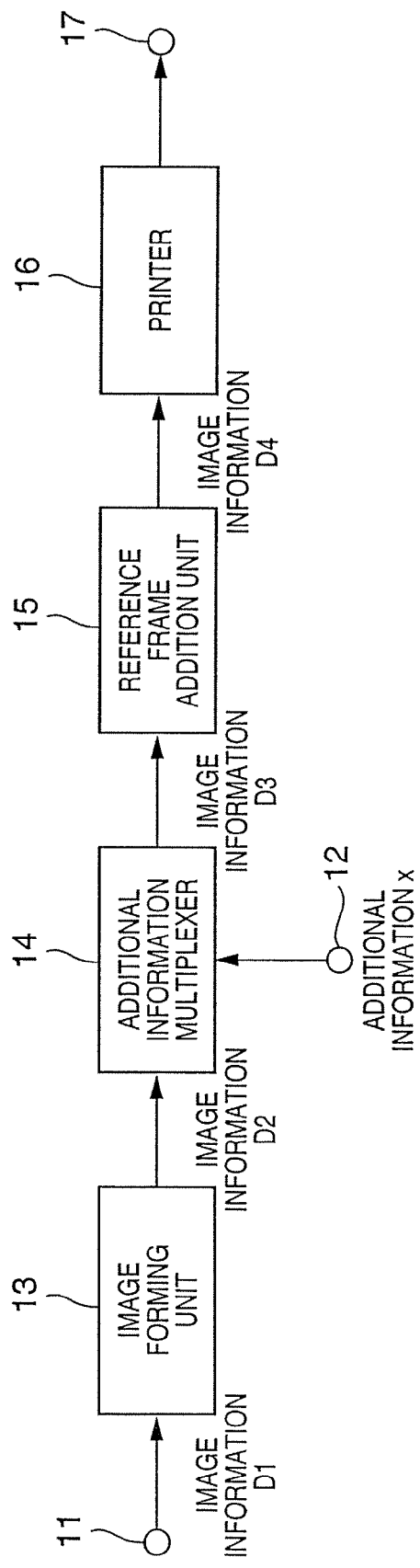
FIG. 1 is a block diagram showing the arrangement of an image processing apparatus for printing a reference frame for accurately specifying an image region in which additional information is embedded, according to the first embodiment of the present invention.

FIG. 1 is a block diagram showing the arrangement of an image processing apparatus for printing a reference frame for accurately specifying an image region in which additional information is embedded, according to the first embodiment of the present invention.

An input terminal 11 inputs multi-level image information D1. An input terminal 12 inputs additional information x of an arbitrary size to be embedded in the multi-level image information D1. This additional information x can be information concerning the copyright of the image information D1 input from the input terminal 11, other related information, or information such as sound information and text document information irrelevant to the image information D1.

The input terminal 11 is connected to an image forming unit 13. This image forming unit 13 converts the input image information D1 into image information D2 having a size of H pixels (vertical direction)×W pixels (horizontal direction) which is the resolution of printing. To be able to specify the size during reading, the values of H and W are preset values or integral multiples of 2Q. Note that Q is a constant larger than read errors of an image scanner or the like used in reading or than errors produced by expansion or contraction of a printing medium. More specifically, Q is an integral multiple of N pixels as the dimension of a block which is a unit in which the additional information x is embedded. Note also that any known method such as nearest neighbor interpolation or linear interpolation can be used as the size converting means.

The image forming unit 13 is connected to an additional information multiplexer 14, so the image information D2 is input to this additional information multiplexer 14. The additional information multiplexer 14 embeds the additional information x in the image information D2 such that the embedded additional information is inconspicuous when the image is printed. After embedding the additional information x in the image information D2, the additional information multiplexer 14 outputs image information D3 in which the additional information is multiplexed.

The additional information multiplexer 14 is connected to a reference frame addition unit 15. This reference frame addition unit 15 adds to the image information D3 information pertaining to a reference frame used to specify an image region when the additional information is to be restored, and outputs as image information D4.

The reference frame addition unit 15 is connected to a printer 16. When receiving the image information D4, this printer 16 forms the image information D4 on a printing medium and outputs as a printed image 17. Note that this printer 16 is, e.g., an inkjet printer or laser printer capable of expressing a tone by using pseudo halftoning.

That is, the image processing apparatus according to this invention is characterized by comprising the additional information multiplexing means (additional information multiplexer 14) for embedding the additional information x in an image (image information D1), the frame adding means (reference frame addition unit 15) for adding a predetermined frame (reference frame) to the perimeter of the image (image information D3) in which the additional information is embedded, and the printing means (printer 16) for printing the image having the additional information embedded in it and the frame onto a printing medium.

Also, the image processing apparatus of this invention is characterized by further comprising the resolution converting means (image forming unit 13) for converting an image into that of a predetermined resolution.

Furthermore, the image processing apparatus of this invention is characterized in that the resolution converting means (image forming unit 13) converts the resolution of an image for printing by a value at least twice a predetermined distortion amount when the printed product (printed image 17) is input.

Figure 2:
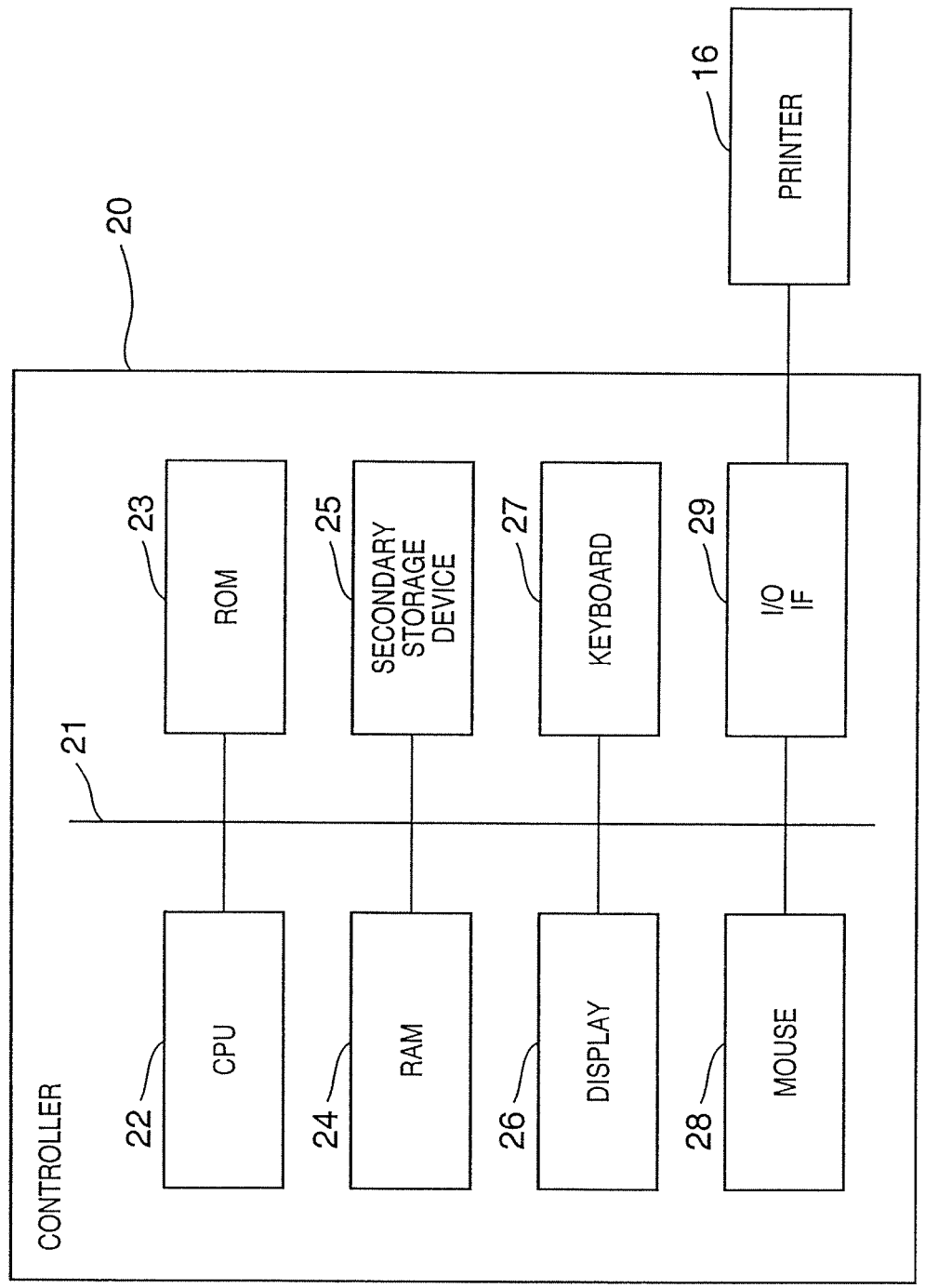
FIG. 2 is a schematic view for explaining a controller 20 for executing the operation of each processing unit in the present invention.

The processing in this image processing apparatus is executed using a controller 20 shown in FIG. 2. FIG. 2 is a schematic view for explaining the controller 20 for executing the operation of each processing unit of the present invention. Referring to FIG. 2, a system bus 21 is connected to a CPU 22, ROM 23, RAM 24, and secondary storage device 25 such as a hard disk. Also, a display 26, keyboard 27, and mouse 28 are connected as user interfaces to the CPU 22 and the like. Furthermore, the printer 16 for image output is connected via an I/O interface 29.

Figure 3:
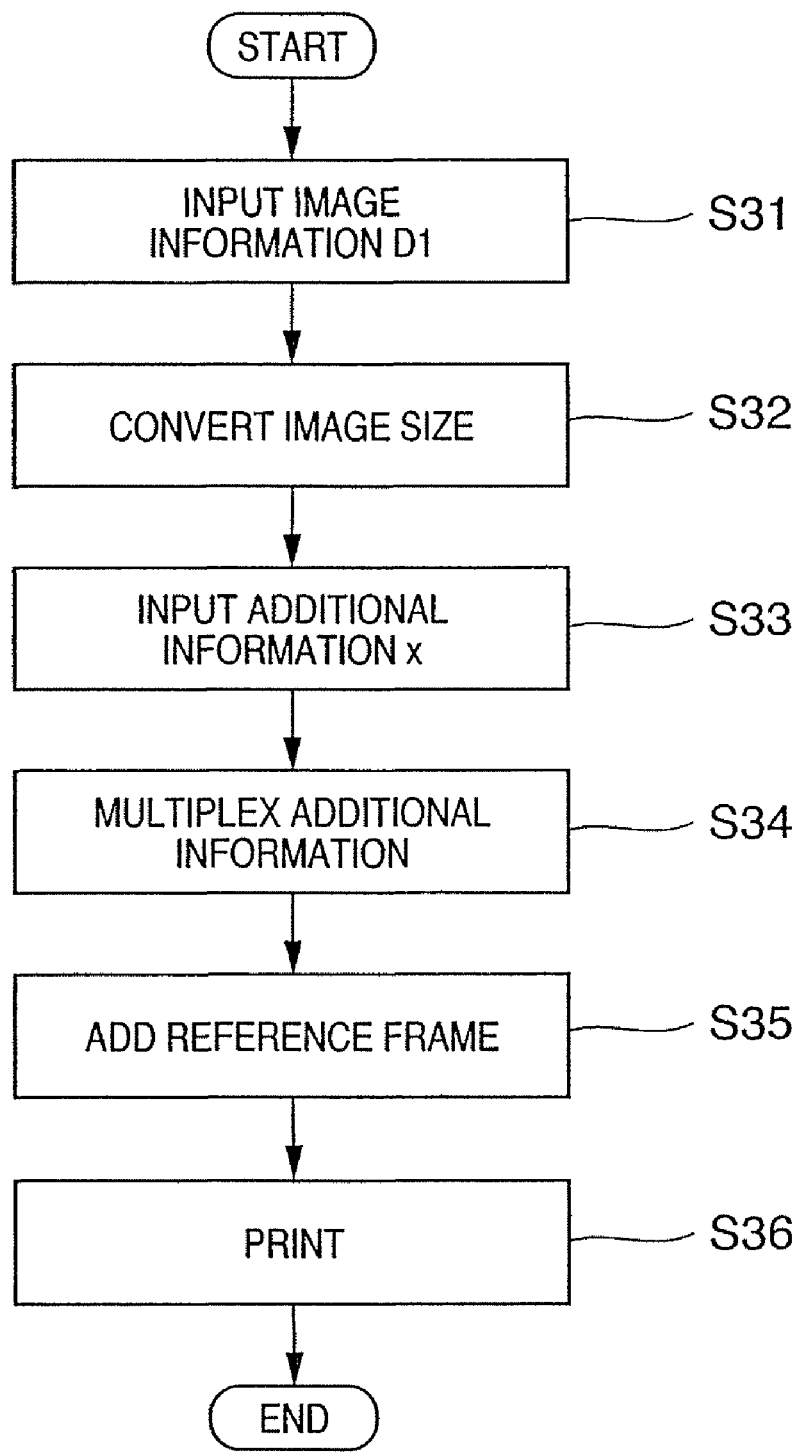
FIG. 3 is a flow chart for explaining the operation procedure of the image processing apparatus shown in FIG. 1.

FIG. 3 is a flow chart for explaining the operation procedure of the image processing apparatus shown in FIG. 1. First, image information D1 is input from the input terminal 11 shown in FIG. 1 (step S31). Next, the image forming unit 13 converts the input image information D1 into image information D2 having a size of H×W pixels as the resolution of printing (step S32). Also, additional information x is input from the input terminal 12 (step S33). This additional information x can be input simultaneously with the image information D1, or can be input beforehand.

The additional information multiplexer 14 segments the input image into square blocks each having N×N pixels, and changes the quantization threshold value of error diffusion in each block in accordance with the bit code of the additional information. By this processing, the additional information multiplexer 14 generates, in each block, a texture which is not generated by normal error diffusion, and forms image information D3 by embedding the additional information x in the image information D2 (step S34). Accordingly, when this image information is decoded, the additional information x can be restored by analyzing the frequency component of the texture.

Figure 4:
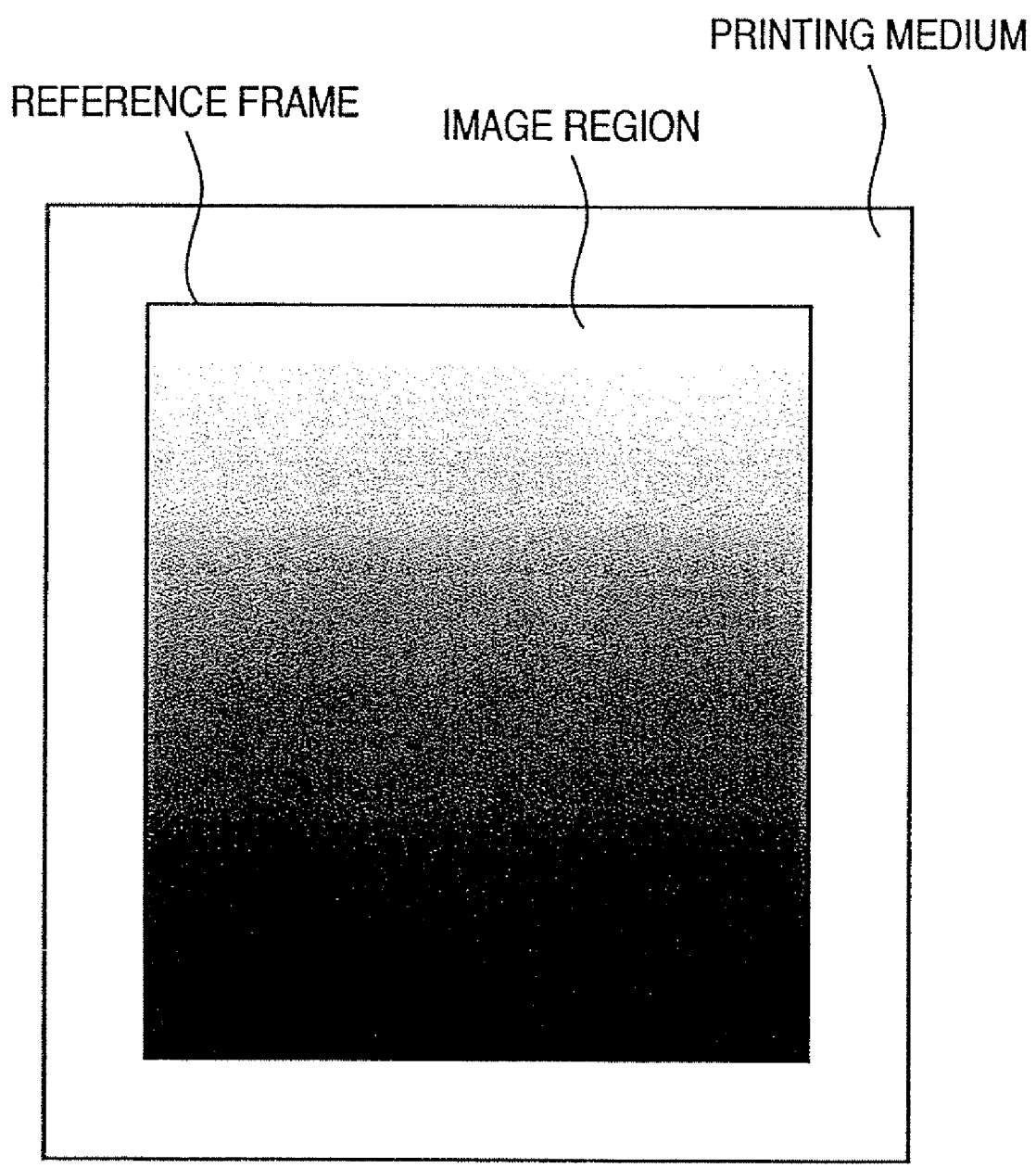
FIG. 4 is a schematic view for explaining the relationship between the reference frame and the image region in a printed image 17.

The reference frame addition unit 15 adds information concerning a reference frame to the perimeter of the image information D3, and outputs as image information D4 (step S35). Additionally, the printer 16 prints the image information D4 formed by the reference frame addition unit 15 onto a printing medium, and outputs as a printed image 17 (step S36). This printer 16 is, e.g., an inkjet printer or laser printer capable of expressing a tone by using pseudo halftoning. FIG. 4 is a schematic view for explaining the relationship between the reference frame and the image region in the printed image 17. As shown in FIG. 4, the reference frame is printed around the image region on the printing medium. Therefore, even when the boundary of the image region has the same color as the printing medium, the edges of this image region can be accurately specified.

Figure 5:
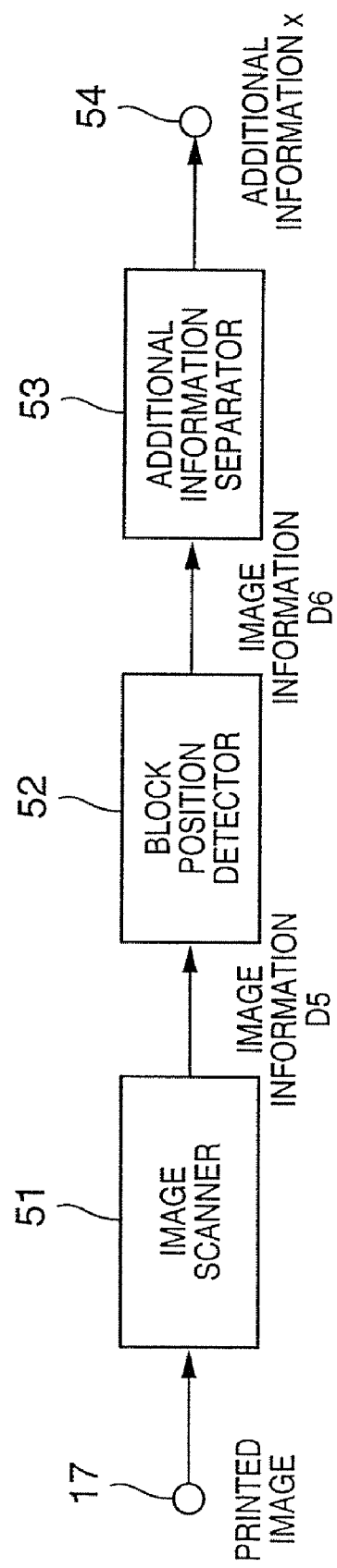
FIG. 5 is a block diagram for explaining the arrangement of an image processing apparatus for inputting a printed image by an image scanner and extracting embedded additional information, according to an embodiment of the present invention.
Figure 6:
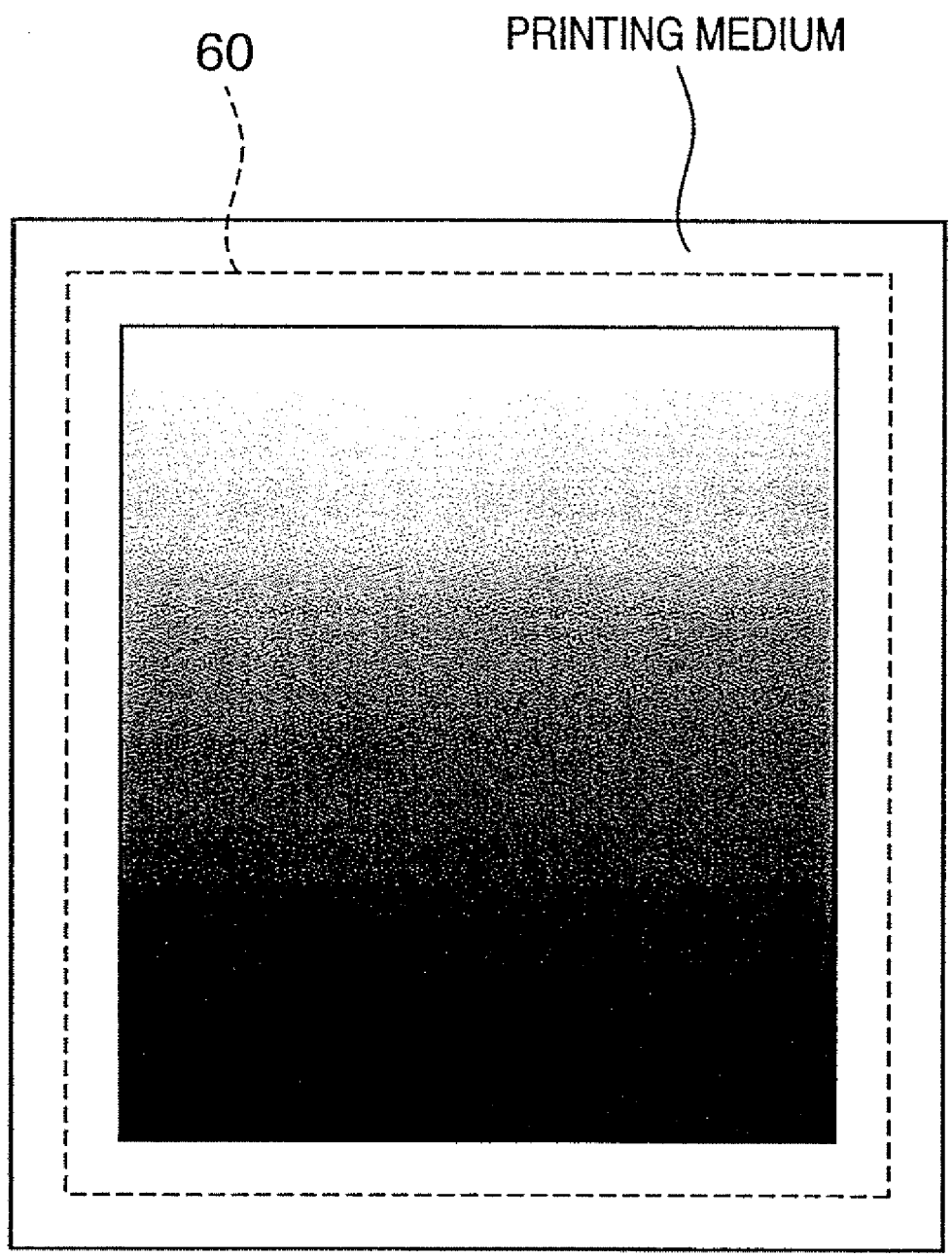
FIG. 6 is a schematic view for explaining the range of an image read by an image scanner.

FIG. 5 is a block diagram for explaining the arrangement of an image processing apparatus for inputting a printed image by using an image scanner and extracting embedded additional information, according to an embodiment of the present invention. Referring to FIG. 5, an image scanner 51 optically reads the printed image 17 printed by the image processing apparatus shown in FIG. 1 and converts the read image into image information D5. FIG. 6 is a schematic view for explaining the range of an image read by the image scanner 51. As shown in FIG. 6, when a printing medium output as the printed image 17 is input to this image scanner 51, a range indicated by a scanner read range 60 containing the image region and a partial printing medium region is trimmed by the user. After that, the scanner read range 60 is optically read and output as the image information D5. This allows the whole image region to be reliably read.

Figure 7:
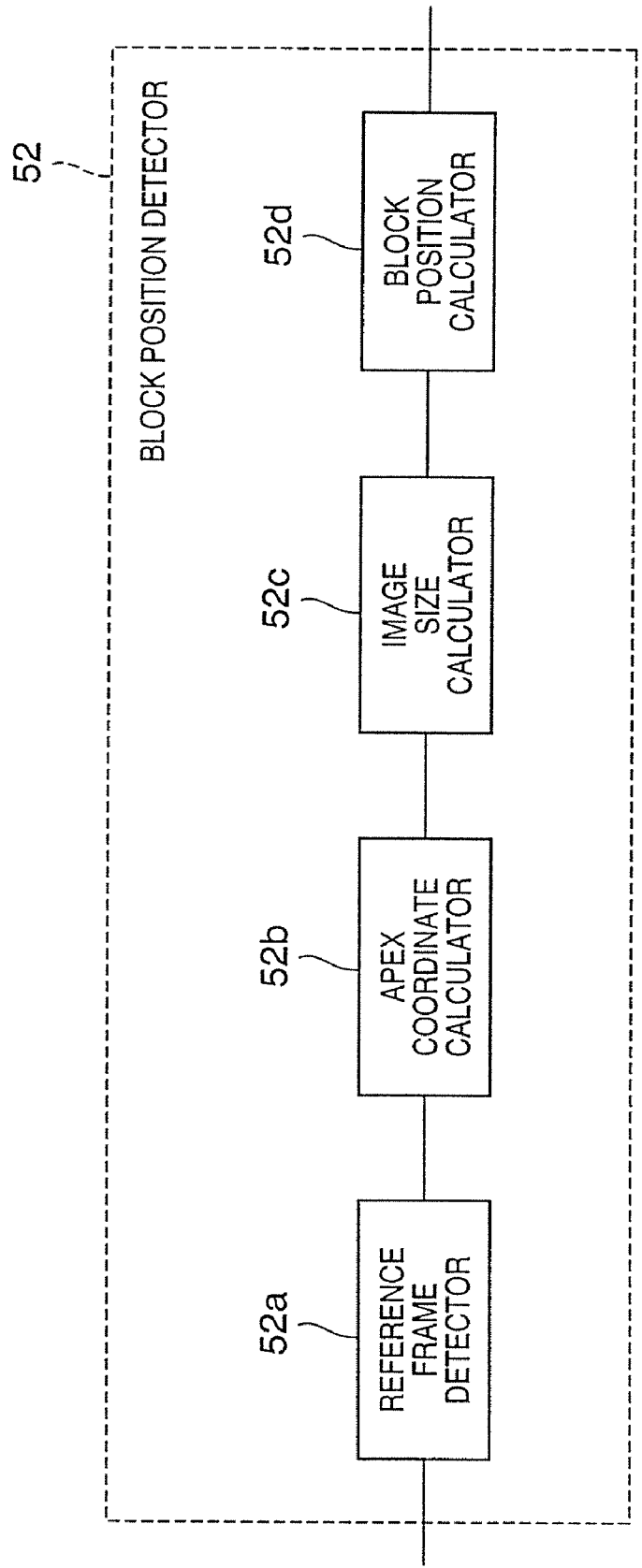
FIG. 7 is a block diagram showing details of the arrangement of a block position detector 52.

The image scanner 51 is connected to a block position detector 52. This block position detector 52 calculates accurate positions of the N×N-pixel square blocks segmented by the additional information multiplexer 14. FIG. 7 is a block diagram showing details of the arrangement of this block position detector 52. As shown in FIG. 7, the block position detector 52 includes a reference frame detector 52a, apex coordinate calculator 52b, image size calculator 52c, and block position calculator 52d.

The reference frame detector 52a uses a known edge detection filter to detect the coordinates of a plurality of points on the reference frame around the image region. The apex coordinate calculator 52b calculates the coordinates of the four apexes of the image region by using the coordinates of the plurality of points on the reference frame detected by the reference frame detector 52a. The image size calculator 52c calculates W×H pixels as the size of the image region. The block position calculator 52d calculates information concerning the positions of all blocks in the image region, and calculates the start positions (the coordinates of the upper left points) of all blocks in which the additional information is embedded.

Information of the calculated block start positions is input to an additional information separator 53 connected to the block position detector 52. This additional information separator 53 analyzes the frequency of the texture on the image block by block, thereby separating and restoring the additional information x. The additional information separator 53 is connected to an output terminal 54.

Similar to the image processing apparatus shown in FIG. 1, the processing in the image processing apparatus shown in FIG. 5 is also executed by using the controller 20 shown in FIG. 2.

That is, the image processing apparatus of this invention is characterized by comprising the input means (image scanner 51) for inputting the printed product (printed image 17) printed on a printing medium by adding a predetermined frame to the perimeter of an image in which additional information is embedded, the frame detecting means (block position detector 52) for detecting a predetermined portion of the frame from the input image, the apex calculating means (block position detector 52) for calculating the apexes of the image from the detected predetermined portion of the frame, the position calculating means (block position detector 52)

for calculating a predetermined position in the image on the basis of the calculated apex positions, and the separating means (additional information separator 53) for separating the additional information embedded in the image on the basis of the calculated predetermined position.

Figure 8:
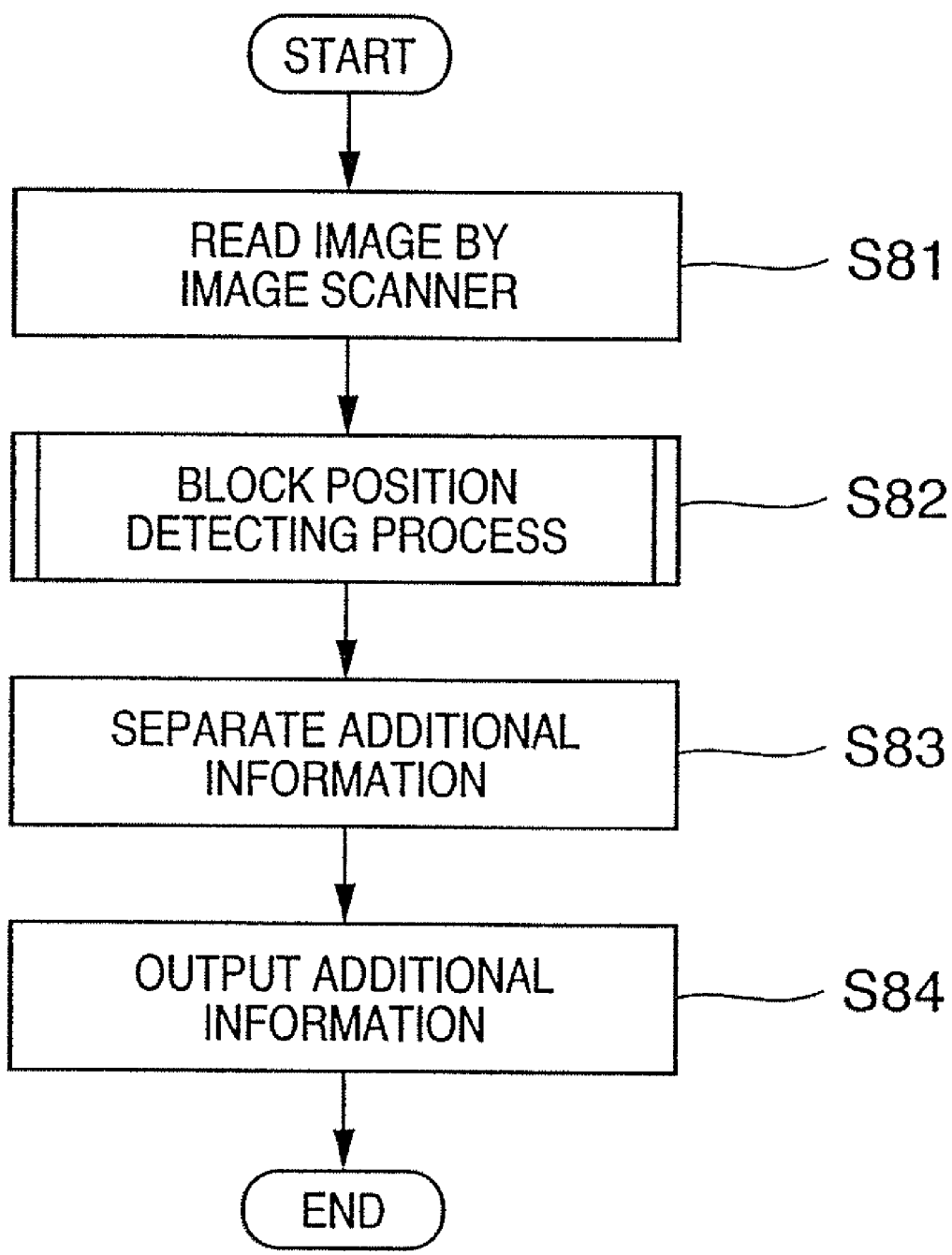
FIG. 8 is a flow chart for explaining the operation procedure of an image processing apparatus for inputting the printed image 17 by an image scanner and extracting additional information x.

FIG. 8 is a flow chart for explaining the operation procedure of the image processing apparatus which inputs the printed image 17 by the image scanner and extracts the additional information x. First, the image scanner 51 optically reads the scanner read range 60 designated in the printed image 17 by the user, and obtains image information D5 (step S81). Subsequently, the block position detector 52 detects block positions in this image information D5 (step S82). The process procedure in this block position detector 52 will be described in detail below.

Figure 9:
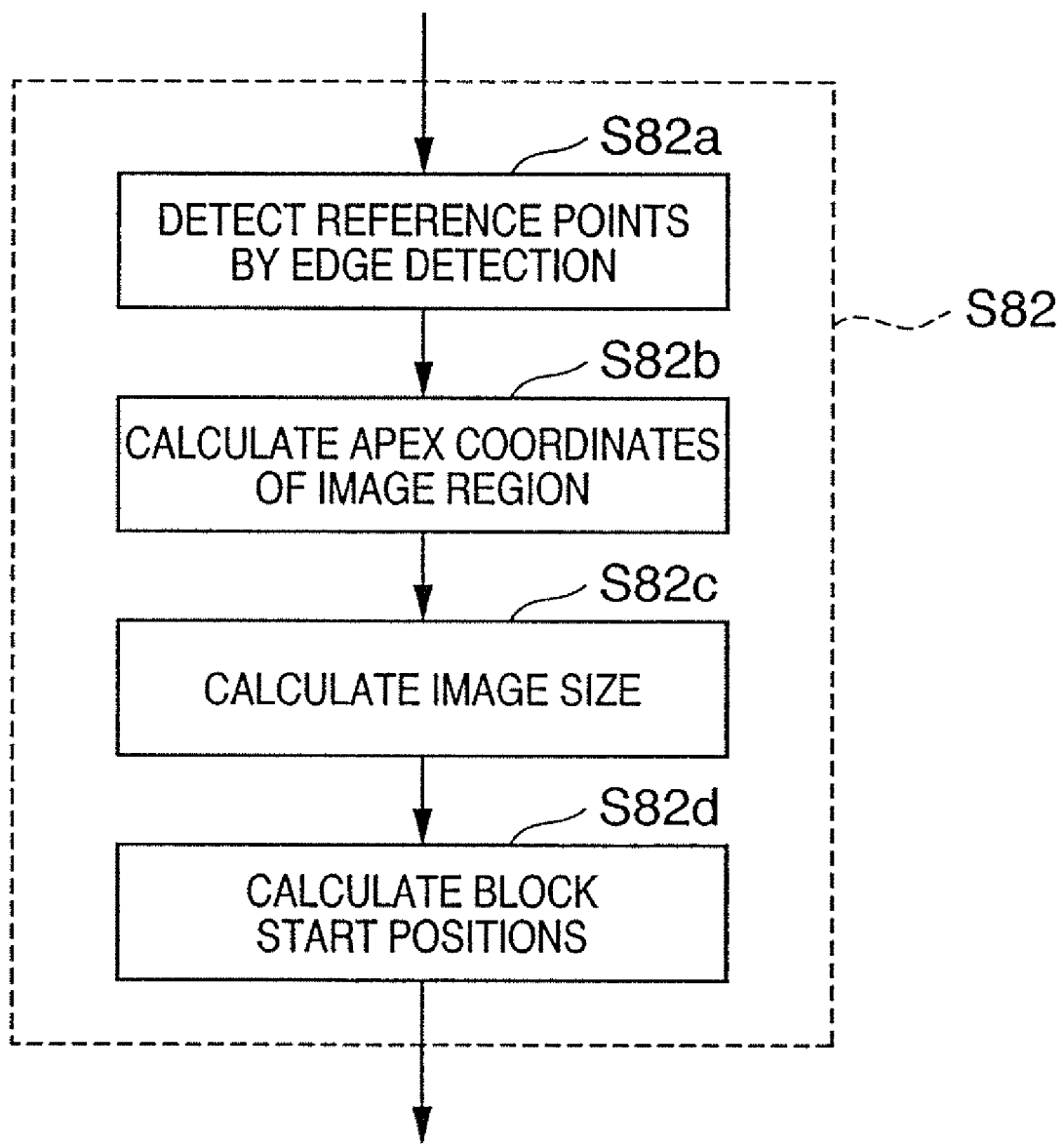
FIG. 9 is a flow chart for explaining the operation procedure of each unit in the block position detector 52 having the arrangement shown in FIG. 7.
Figure 10:
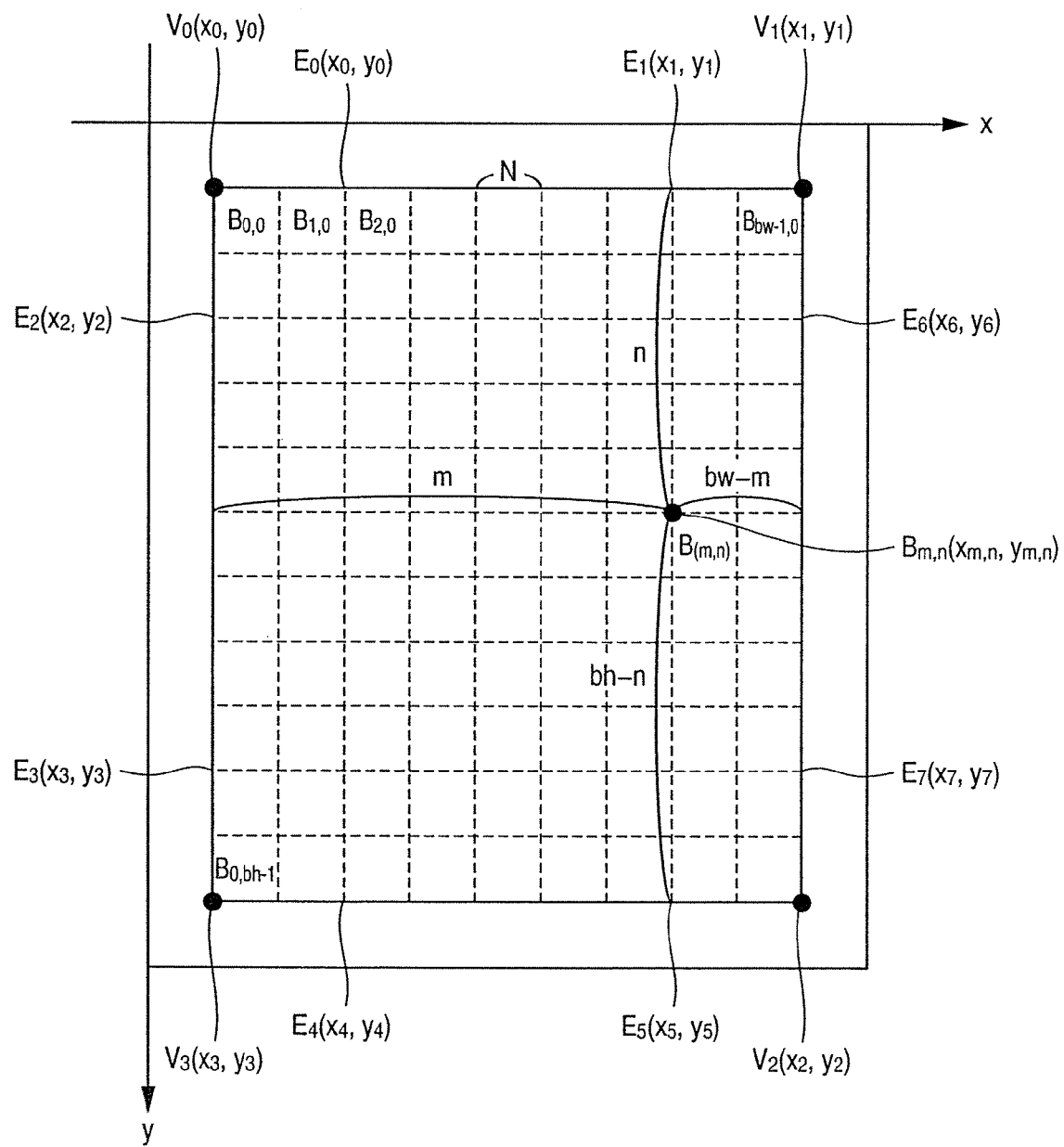
FIG. 10 is a view for explaining eight reference points on the reference frame obtained by a reference frame detector 52*a*.

FIG. 9 is a flow chart for explaining the operation procedure of each unit in the block position detector 52 having the arrangement shown in FIG. 7. First, from the image information D5 as an image obtained by reading the scanner read range in the printed image 17, the reference frame detector 52a detects, on the reference frame, the coordinates of a plurality of points meeting preset conditions by using a known edge detection filter (step S82a). FIG. 10 is a view for explaining eight reference points on the reference frame obtained by the reference frame detector 52a.

In this embodiment as shown in FIG. 10, two reference points are set beforehand on each side of the reference frame, and a total of eight reference points are detected. Referring to FIG. 10, $E_i(x_i, y_i)$ (i=0, ..., 7) are these eight reference points. For example, $E_0(x_0, y_0)$ and $E_1(x_1, y_1)$ are reference points in the upper portion of the reference frame in the image information D5 as a scanned image, and are obtained as edge pixels at any given distances set from the left- and right-hand sides of the image. These points can also be pixels at any given distances set not from the left- and right-hand sides but from the central line of the image toward the left- and right-hand sides. Other reference points are also similarly obtained. In this embodiment, the number of reference points is two on each side for the sake of simplicity. However, the present invention of course includes a case in which the number is larger than this one.

Next, the apex coordinate calculator 52b calculates the coordinates $V_j(x_j, y_j)$ (j=0, ..., 3) of the four apexes of the image region by using the obtained eight reference points on the reference frame 53 (step S82b). More specifically, equations of four straight lines are calculated from the two reference points on each side, and the coordinates of the intersections of these straight lines are calculated as the coordinates of the apexes.

In addition, on the basis of the calculated coordinates of the four apexes, the image size calculator 52c calculates H×W pixels as the size of the image in accordance with the following equations (step S82c).

$$W = t_1 \cdot 2Q = t_2 \cdot 2Q$$

$$H = t_3 \cdot 2Q = t_4 \cdot 2Q$$

where $t_1$ is a maximum integer not exceeding the value of $$\frac{x_1 - x_0}{2Q},$$

$t_2$ is a maximum integer not exceeding the value of $$\frac{x_2 - x_3}{2Q},$$

$t_3$ is a maximum integer not exceeding the value of $$\frac{y_3 - y_0}{2Q},$$

and $t_4$ is a maximum integer not exceeding the value of $$\frac{y_2 - y_1}{2Q}.$$

The data of the apex coordinates $V_j(x_j, y_j)$ (j=0, ..., 3) and the image size H×W pixels obtained by the series of processes described above is input to the block position calculator 52d where the start positions (the coordinates of the upper left points) of all blocks in which the additional information is embedded are calculated (step S82d). This method will be explained next. In this embodiment, bh×bw blocks are present in the image region. Since each block is a square block having N pixels on each side, the values of bh and bw are calculated by $$bw = W/N$$

$$bh = H/N$$

In this embodiment, therefore, the coordinate system as shown in FIG. 10 is set, and the start position $B_{m,n}(x_{m,n}, y_{m,n})$ of the (m,n)th block is calculated within the range $$m = 0, \ldots, bw-1$$

$$n = 0, \ldots, bh-1$$

These block start positions $B_{m,n}(x_{m,n}, y_{m,n})$ can be easily calculated by using the four apexes $V_j(x_j, y_j)$ (j=0, ..., 3) and a known internally dividing point calculation method.

The block start positions $B_{m,n}(x_{m,n}, y_{m,n})$ calculated by the above method and image information D6 read by the image scanner 51 are input to the additional information separator 53 where the additional information x is separated (step S83). This separated additional information x is output from the output terminal 54 (step S84).

In the first embodiment of the present invention as explained above, even when an image in which the edges of an image region are blurred when the image is printed is input, this image region can be accurately detected by adding a reference frame to the edges of the image region. Also, when a printed image is to be read, a range required to be read by an image scanner is clearly shown to the user, and block positions are accurately detected. As a consequence, additional information can be accurately restored.

Second Embodiment

Calculation of the block start position $B_{m,n}(x_{m,n}, y_{m,n})$ by the method explained in the above first embodiment is particularly effective when an image scanner having relatively high accuracy and a printing medium which does not largely expand or contract with respect to environmental changes are used. However, inexpensive flat bed scanners provided to general consumers generate distortion resulting from their optical systems or distortion caused by unstable driving systems. Therefore, even when the four apexes are accurately calculated by using the reference frame, it is sometimes impossible to accurately calculate block start positions in the image region.

Figure 11:
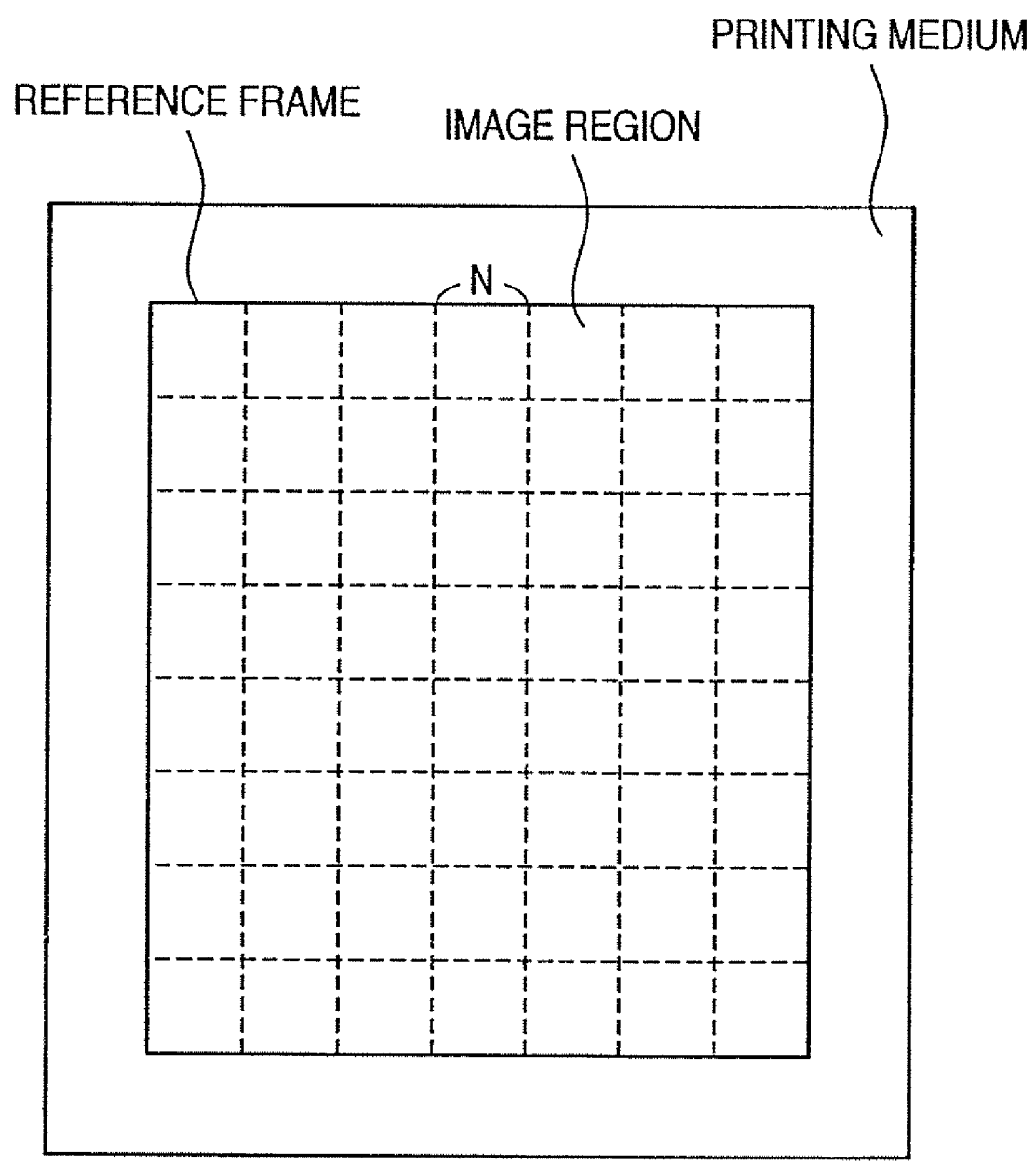
FIG. 11 is a schematic view for explaining a reference frame on which reference marks are formed.

In this second embodiment, therefore, to solve the above problem, gaps are formed in predetermined portions, as shown in FIG. 11, of the reference frame added in the first embodiment, and these gaps are used as reference marks to calculate accurate block start positions. FIG. 11 is a schematic view for explaining a reference frame having these reference marks.

Figure 12:
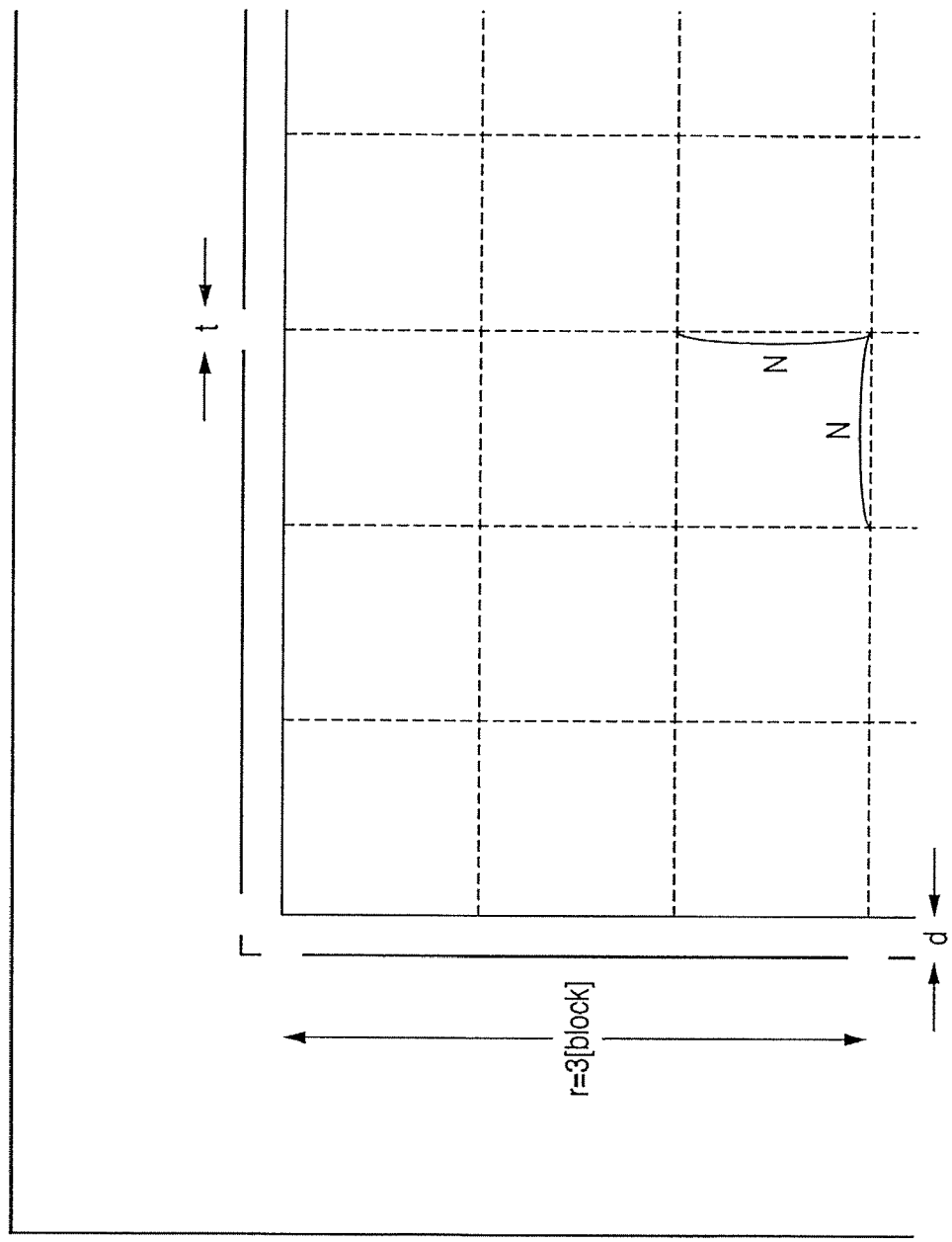
FIG. 12 is an enlarged view of the upper left portion of the image shown in FIG. 11.

FIG. 12 is an enlarged view of the upper left portion of the image shown in FIG. 11. Referring to FIG. 12, the gaps are t [pixel] having a preset value and are set at intervals of r (in this embodiment, three blocks). In FIG. 12, the reference frame is set at a distance of d [pixel] which is a preset value from the image region. This is so because if the reference frame is set with no spacing from the image region and the image is output by an inkjet printer, the gaps are erased by ink in a region in which the edge of the image region has the same color (e.g., black) as the reference frame, and this makes the reference frame undetectable when the image is read.

That is, the image processing apparatus of this invention is characterized by further comprising a mark adding means (reference frame addition unit 15) for adding, on a frame (reference frame), predetermined marks (reference marks) corresponding to additional information embedded in each predetermined region of an image.

Also, the image processing apparatus of this invention is characterized in that the marks (reference marks) are blank portions each having a predetermined length formed at predetermined intervals on the frame (reference frame).

Furthermore, the image processing apparatus of this invention is characterized in that the frame (reference frame) is added at a predetermined distance from the edges of an image.

The individual parameters described above are designed in accordance with the accuracy of an image scanner and the properties of a printing medium. For example, when an image is printed by a printer having a resolution of 600 dpi and read by an image scanner having the same resolution of 600 dpi, minimum values with which t-pixel gaps formed on the reference frame are accurately detected as reference marks are t=2 [pixel] and d=1 [pixel].

Image information to which the reference frame having the gaps formed by the above method is added is printed on a printing medium by a printer 16. This image printed on the printing medium is read by an image scanner 51 in the same manner as in the first embodiment. The obtained image information is input to a block position detector 52.

Figure 13:
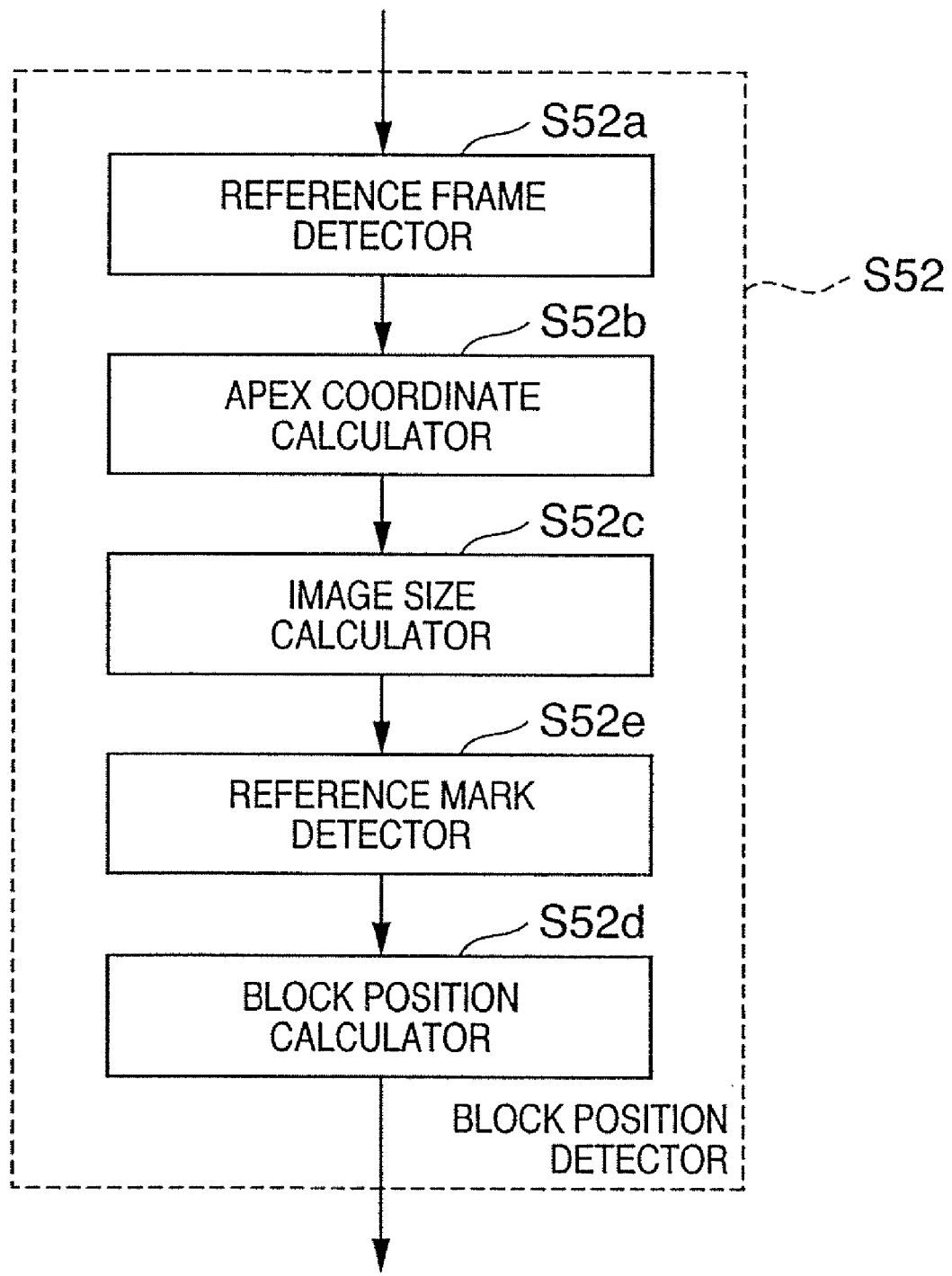
FIG. 13 is a block diagram showing details of the arrangement of a block position detector 52 according to the second embodiment of the image processing apparatus shown in FIG. 5.

FIG. 13 is a block diagram showing details of the arrangement of the block position detector 52 according to the second embodiment of the image processing apparatus shown in FIG. 5. Referring to FIG. 13, the arrangements and operations of a reference frame detector 52a, apex coordinate calculator 52b, and image size calculator 52c are the same as in the first embodiment shown in FIG. 7. This embodiment differs from the first embodiment in that a reference mark detector 52e is connected between the image size calculator 52c and a block position calculator 52d.

That is, image information read by the image scanner 51 is input to the reference frame detector 52a. This reference frame detector 52a obtains eight reference points $E_i(x_i,y_i)$ (i=0, ..., 7) on the reference frame by the same processing as in the first embodiment. Note that as in the first embodiment, the number of reference points to be detected is two on each side for the sake of simplicity. However, the present invention is not limited to this number.

Coordinate information pertaining to the obtained reference points is input to the apex coordinate calculator 52b where the coordinates $V_j(x_j,y_j)$ (j=0, ..., 3) of the four apexes of an image region are calculated in the same manner as in the first embodiment. The obtained coordinate values are input to the image size calculator 52c where H×W pixels as the size of the image region are calculated by the same processing as in the first embodiment.

The apex coordinates $V_j(x_j,y_j)$ (j=0, ..., 3) obtained by the above processing and H×W pixels as the image region size are input together with the image information to the reference mark detector 52e.

FIG. 14 is a flow chart for explaining the operation procedure of the reference mark detector 52e according to this embodiment. First, the reference mark detector 52e specifies the coordinate positions of gaps present on the upper reference frame. The reference mark detector 52e then sets the start position to $(sx,sy)=(x_0,y_0)$ and the end position to $(ex,ey)=(x_1,y_1)$ and also sets the number of end blocks to end.r=bw (step S1401). Subsequently, the reference mark detector 52e initializes parameters j and max to r and 0, respectively (step S1402).

Next, the reference mark detector 52e calculates the reference position (cx,cy) of a search range of gaps as reference marks by $$(cx, cy) = \left( \frac{j \cdot x_1 + (bw - j) \cdot x_0}{bw}, \frac{j \cdot y_1 + (bw - j) \cdot y_0}{bw} \right)$$

which is a formula for calculating an internally dividing point.

Figure 15:
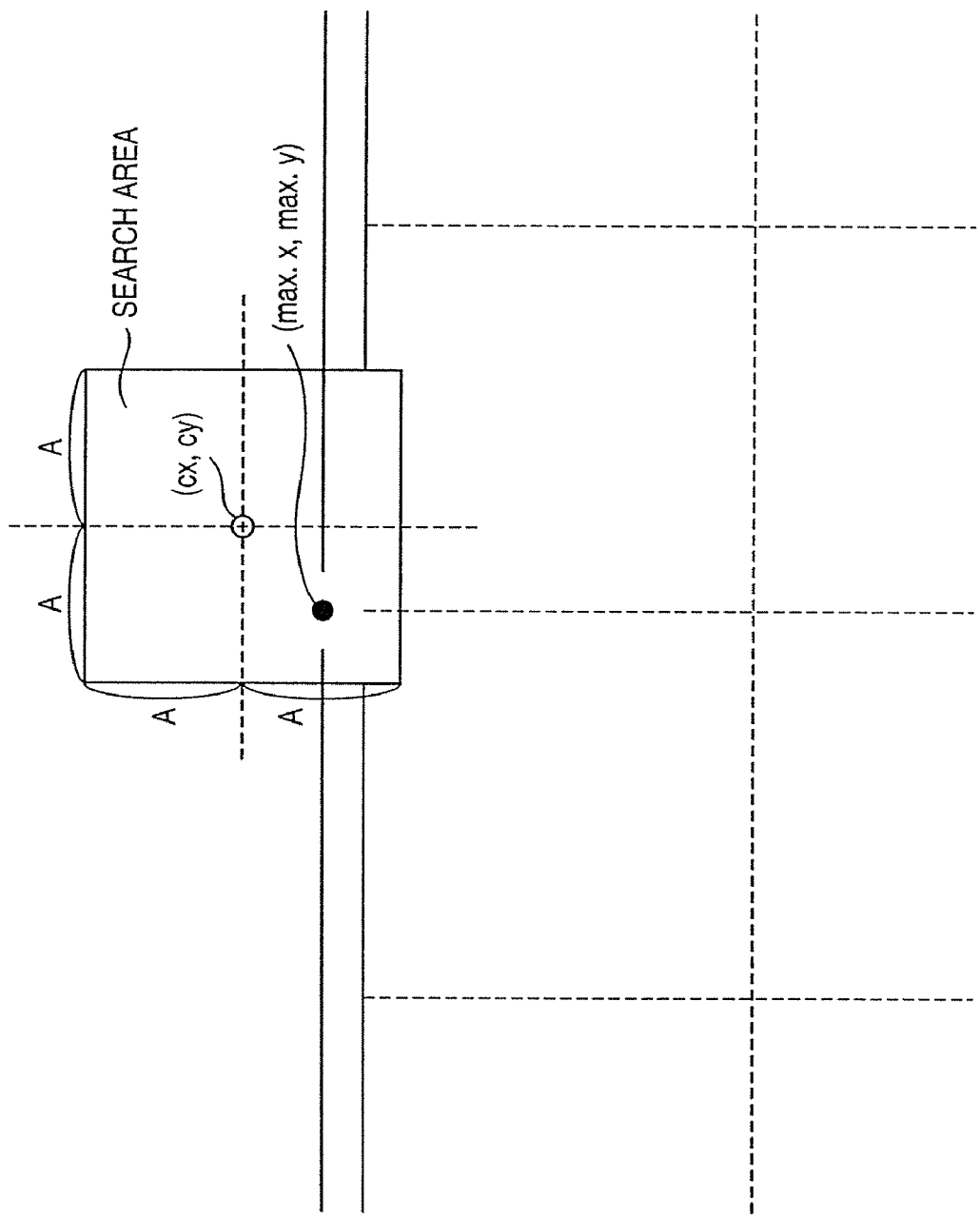
FIG. 15 is a schematic view for explaining the positional relationship between a reference mark and a reference position (cx,cy)

Under conditions in which, e.g., a printed image is read by an accurate image scanner, the calculated reference position (cx,cy) presumably matches the center of a reference mark. However, various factors as described above usually produce a difference of at least about a few pixels as shown in FIG. 15. FIG. 15 is a schematic view for explaining the positional relationship between the reference mark and the reference position (cx,cy). Referring to FIG. 15, (max.x,max.y) indicates the reference mark position (reference mark center). In this embodiment, the reference mark search range (search area) is set as a range of (2A+1)×(2A+1) pixels having the reference position (cx,cy) as its center (step S1403).

The reference mark detector 52e sets the difference between cy and A as yy (step S1404) and the difference between cx and A as xx (step S1405). Additionally, the reference mark detector 52e calculates an evaluation amount S necessary to detect the reference marks (step S1406). The following equation is an example of a reference mark detection filter for calculating the evaluation amount S for detecting the reference marks on the upper and lower sides of the reference frame.

$$f_h(k)=[-1,-1,-1,0,6,0,-1,-1,-1]$$

In this embodiment, within the search area (reference mark search range) centering around (cx,cy), the output value processed through the above filter by using (xx,yy) as the center is calculated as the evaluation amount S. (xx,yy) when the calculated evaluation amount S is a maximum in the search area is set as the reference mark position (max.x,max.y) (steps S1406 to S1412). By repetitively applying this procedure, the reference marks on the upper side of the reference frame can be detected (steps S1403 to S1414).

After detecting the reference mark positions on the upper side of the reference frame as described above, the reference mark detector 52e calculates the reference mark positions on the lower side and on the left- and right-hand sides of the reference frame following exactly the same procedure as above (steps S1415 to S1420), except that a filter indicated by the following equation is used, instead of the filter $f_h$ (k) described above, to calculate the reference marks on the left- and right-hand sides.

$f_v(=[-1,-1,-1,0,6,0,-1,-1,-1]$

Figure 16:
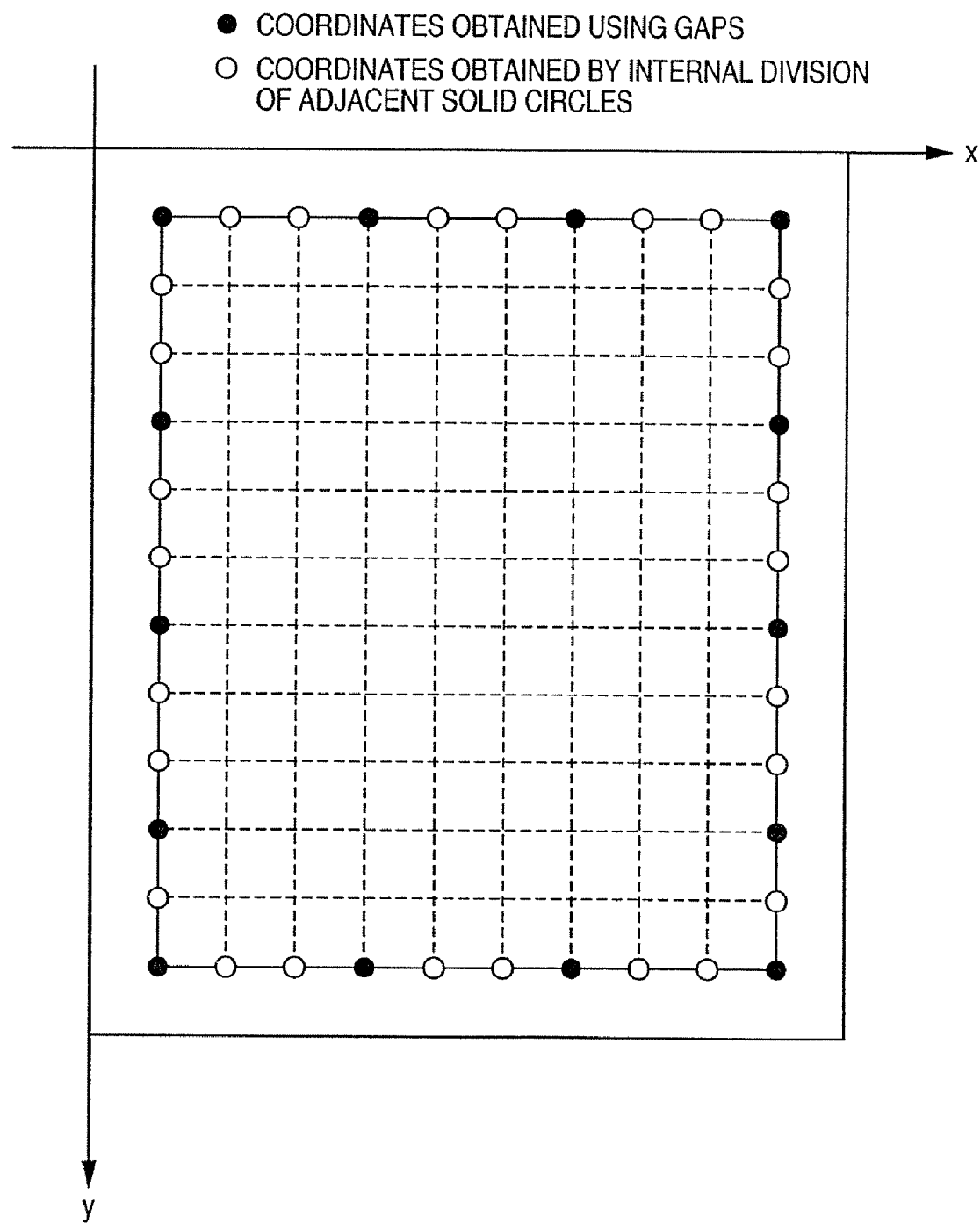
FIG. 16 is a schematic view for explaining reference marks and internally dividing points obtained by internal division in each block on the reference frame.

The foregoing is the explanation of the reference mark detector according to the second embodiment. When the processing in the reference mark processor is complete, the coordinates of portions (reference mark positions) indicated by solid circles shown in FIG. 16 are detected. FIG. 16 is a schematic view for explaining the reference marks on the reference frame and internally dividing points obtained by internal division in each block.

Subsequently, the block position calculator 52d uses the coordinates of the solid circles shown in FIG. 16 to calculate block start positions (open circles) on the reference frame except for the reference marks.

Figure 17:
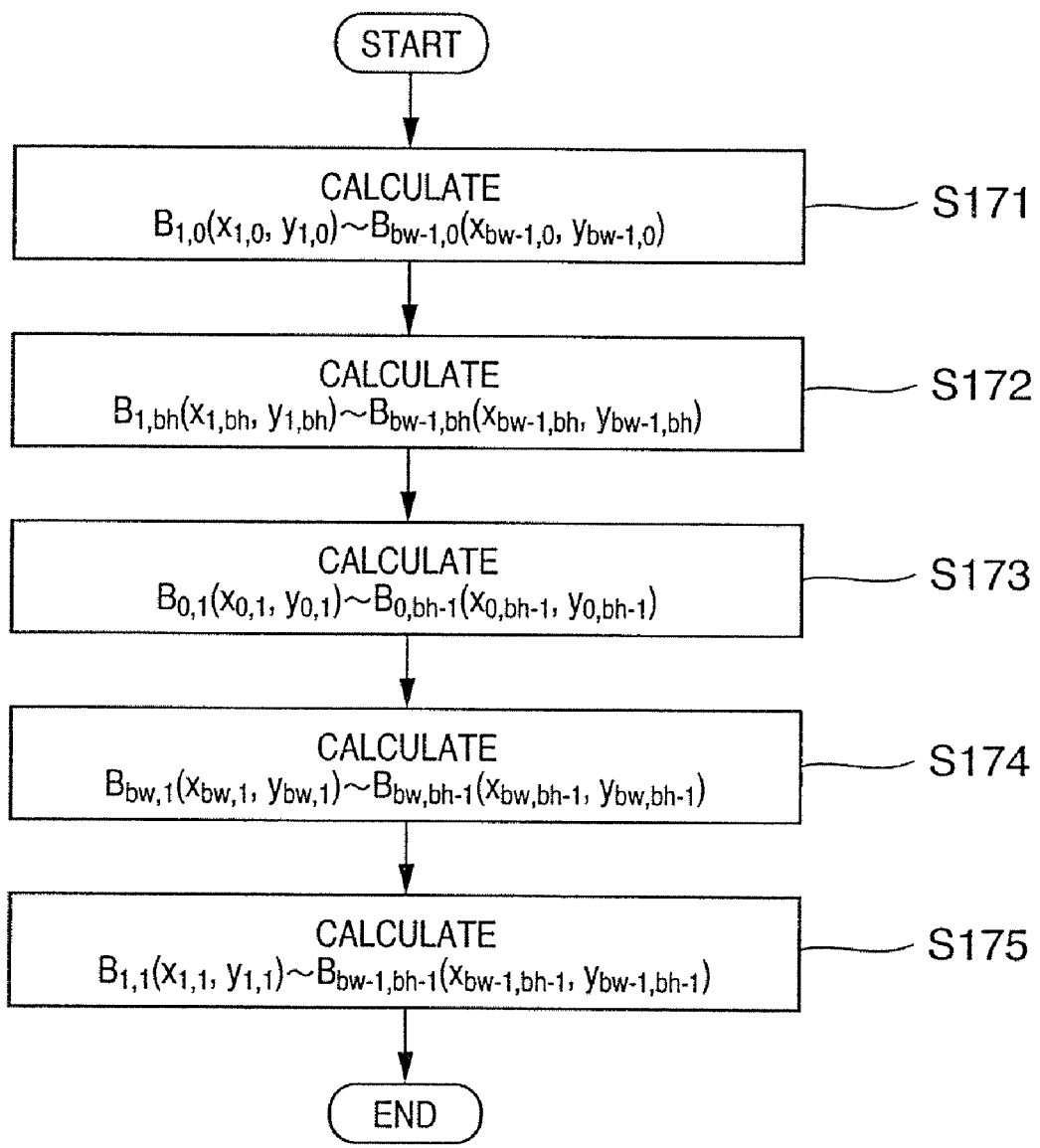
FIG. 17 is a flow chart for explaining the process procedure of a block position calculator 52d in the second embodiment.

FIG. 17 is a flow chart for explaining the process procedure in the block position calculator 52d according to the second embodiment. As shown in FIG. 17, by using the coordinates of those portions indicated by the solid circles in FIG. 16, which are already subjected to position detection, the block position calculator 52d calculates the remaining block start positions between the adjacent solid circles, i.e., the coordinates of the positions indicated by the open circles in FIG. 16 (steps S171 to S174). Note that a known internally dividing point calculation method is used as this coordinate calculation method.

If all the block start positions on the reference frame are calculated, the block position calculator 52d uses these calculated coordinate positions to calculate all the block start positions in the image region (step S175). In this embodiment, the coordinates of an internal block start position $B_{m,n}$ $(x_{m,n}, y_{m,n})$ (m=1, ..., bw-1, n=1, ..., bh-1) are calculated by the following method.

Figure 18:
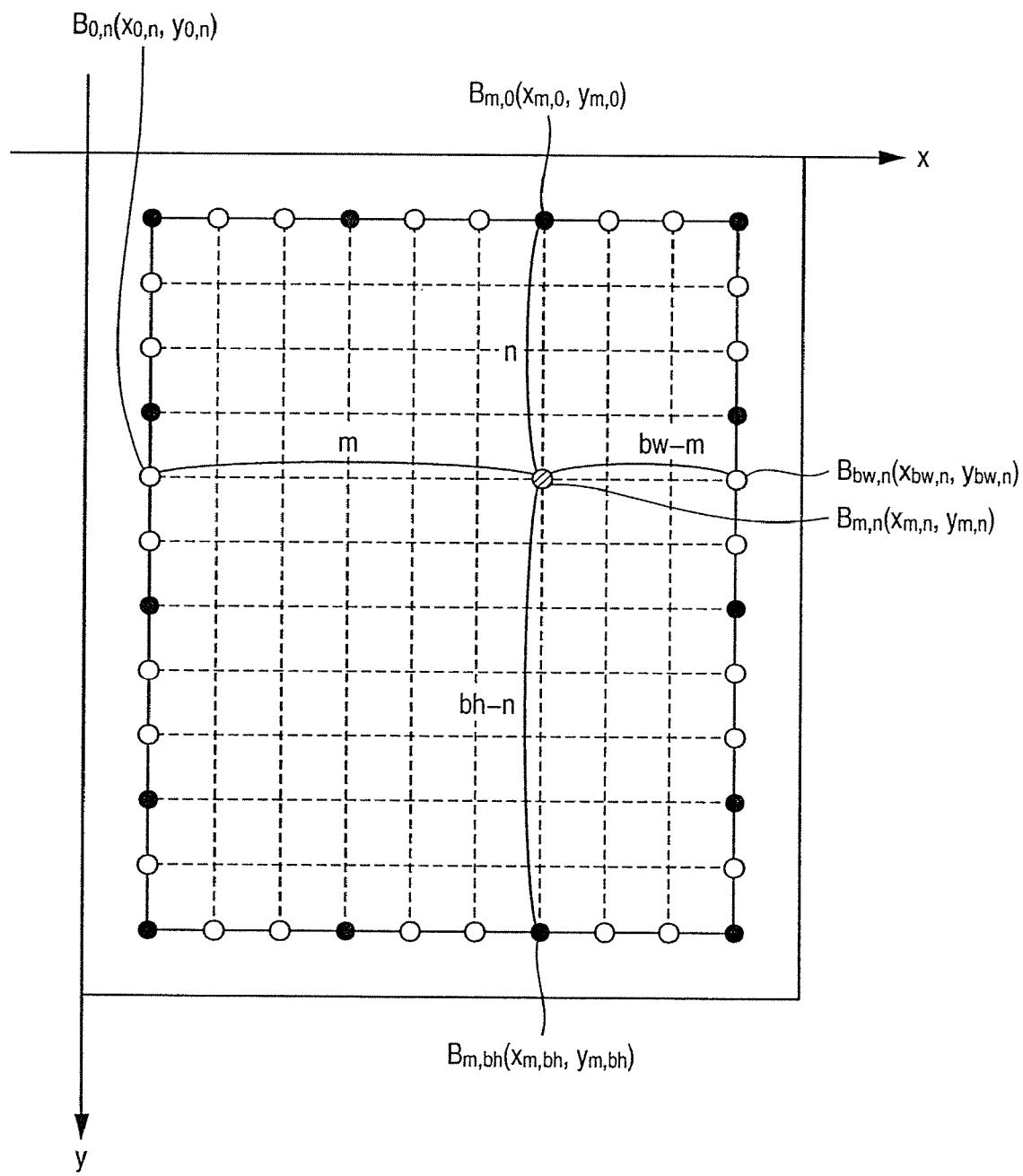
FIG. 18 is a schematic view for explaining the relationship between four predetermined coordinate points on the reference frame and an internal block start position.
Figure 19:
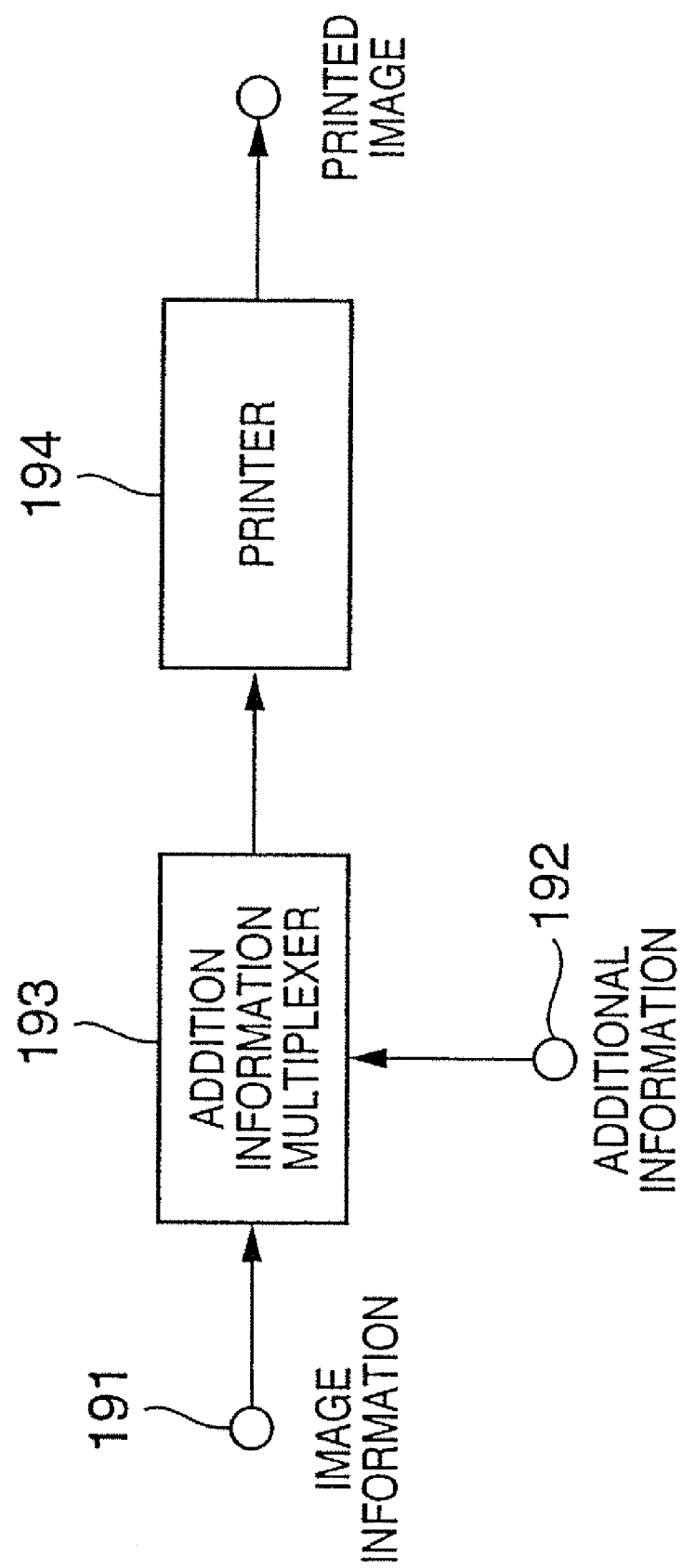
FIG. 19 is a block diagram showing the arrangement of a conventional image processing apparatus for outputting a printed image by embedding additional information in an arbitrary image.
Figure 20:
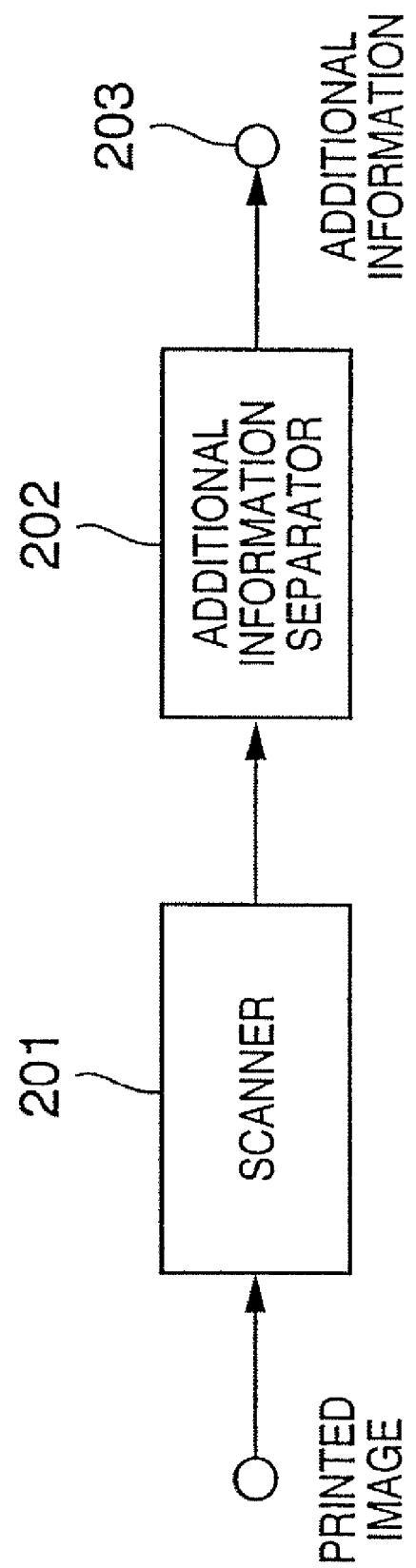
FIG. 20 is a block diagram showing the arrangement of a conventional image processing apparatus for extracting the embedded additional information from the printed image output from the image processing apparatus shown in FIG. 19.
Figure 21:
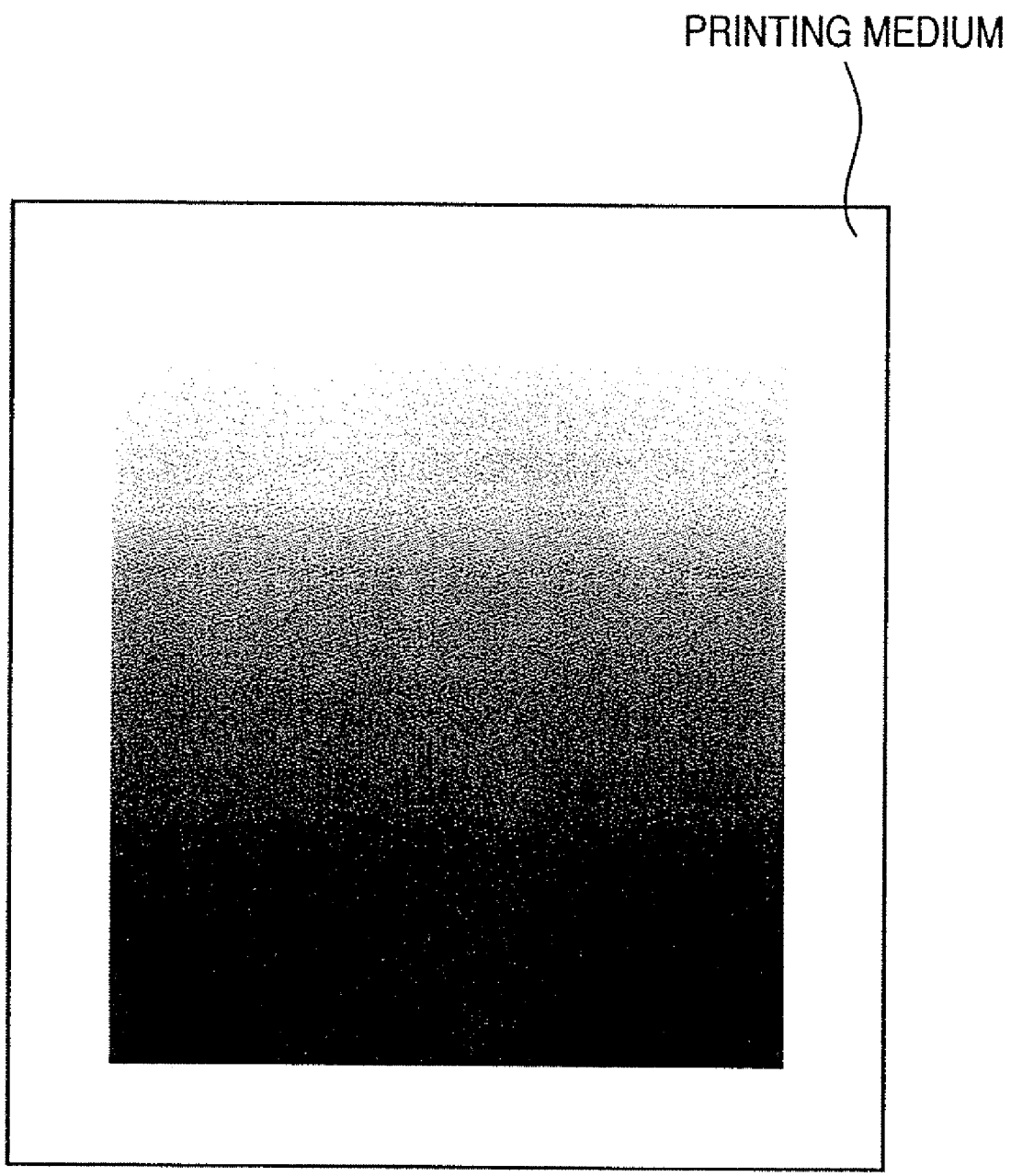
FIG. 21 is a view showing an example of a printed image in which the boundary of an image region is obscure.

That is, as shown in FIG. 18, to calculate the start position $B_{m,n}(x_{m,n}, y_{m,n})$ of the (m,n)th block, the following equation is calculated by using the four predetermined coordinate points on the reference frame obtained by the above procedure. FIG. 18 is a schematic view for explaining the relationship between the four predetermined coordinate points on the reference frame and the internal block start position.

$$(x_{m,n}, y_{m,n}) = \left( \frac{n \cdot x_{m,bh} + (bh-n) \cdot x_{m,0}}{bh}, \frac{m \cdot y_{bw,n} + (bw-m) \cdot y_{0,n}}{bw} \right)$$

The above equation means that the X- and Y-coordinates of the start position of the (m,n)th block are calculated using only the X-coordinates of the reference points on the upper and lower sides and only the Y-coordinates of the reference points on the left- and right-hand sides, respectively.

The above-mentioned coordinate calculation method is used for the reasons explained below. In common popular type, inexpensive flat bed scanners, image distortion caused by a carriage driving system mainly appears in the sub-scan direction, and its distortion amount is constant in the main scan direction. That is, for distortion like this, position correction in the sub-scan direction need only be performed using only the calculated coordinates on the left- and right-hand sides of the reference frame.

Also, image distortion caused by an optical system primarily appears only in the main scan direction, and its distortion amount is constant in the sub-scan direction. For distortion like this, therefore, position correction in the main scan direction need only be performed using only the calculated coordinates on the upper and lower sides of the reference frame.

For the above reasons, most distortion of an image read by a popular type, inexpensive flat bed scanner can be removed by the block position calculation method as described above in this embodiment, so block positions can be detected very accurately. The block start positions $B_{m,n}(x_{m,n}, y_{m,n})$ obtained by the above method and the image information read by the image scanner 51 are input to the additional information separator 53 where the additional information x is separated. The separated additional information x is output from an output terminal 54.

In the second embodiment of the present invention as described above, even when an image scanner having distortion resulting from an optical system and driving system is used or even when a printing medium expands or contracts in accordance with the environment, block start positions in an image region can be specified more accurately than in the conventional position correction method. Accordingly, additional information can be accurately restored.

The present invention is not restricted to the combination of the two types of image processing apparatuses described above.

That is, the image processing apparatus of this invention is characterized by further comprising the mark detecting means (block position detector 52) for detecting predetermined marks formed on a frame (reference frame) and corresponding to additional information.

Furthermore, the image processing apparatus of this invention is characterized in that the position calculating means (block position detector 52) comprises the X-coordinate calculating means for calculating the X-coordinate of a predetermined position by using the X-coordinate of a mark present in a direction perpendicular to that position, and the Y-coordinate calculating means for calculating the Y-coordinate of that position by using the Y-coordinate of the mark present in the direction perpendicular to that position.

As explained above, the present invention can effectively add a reference frame for accurately specifying an image region printed on a printing medium.

Third Embodiment

Figure 22:
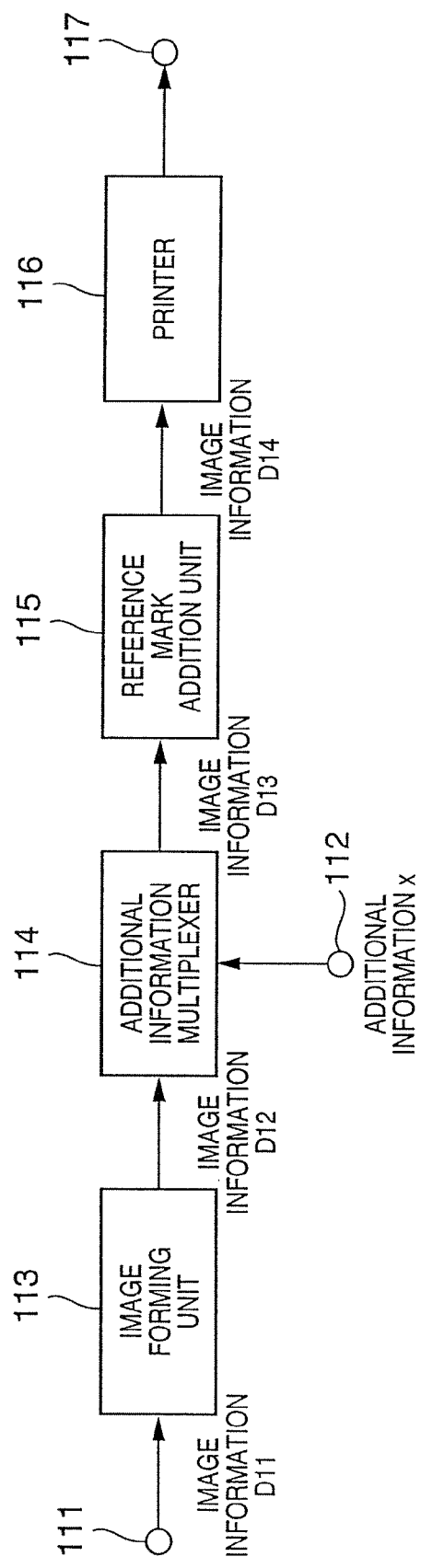
FIG. 22 is a block diagram for explaining the arrangement of an image processing apparatus for printing image information by embedding additional information in the image, according to an embodiment of the present invention.

FIG. 22 is a block diagram for explaining the arrangement of an image processing apparatus for printing an image by embedding additional information in the image, according to an embodiment of the present invention. An input terminal 111 inputs multi-level image information D11. An input terminal 112 inputs additional information x of an arbitrary size to be embedded in the multi-level image information D11. This additional information x can be information related to the image information D11 input from the input terminal 111, e.g., information concerning the copyright of the image information D11, or information irrelevant to the image information D11, e.g., sound information, text document information, or another image information.

The input terminal 111 is connected to an image forming unit 113. This image forming unit 13 converts the input image information D11 into image information D12 having a size of H×W pixels which is the resolution of printing. Note that any known method such as nearest neighbor interpolation or linear interpolation can be used as the size converting means.

The image forming unit 113 is connected to an additional information multiplexer 114, so the image information D12 is input to this additional information multiplexer 114. The additional information multiplexer 114 embeds the additional information x in the image information D12 such that the embedded additional information is inconspicuous when the image is printed. After embedding the additional information x in the image information D12, the additional information multiplexer 114 outputs image information D13 in which the additional information is multiplexed.

The additional information multiplexer 114 is connected to a reference mark addition unit 115. This reference mark addition unit 115 adds to the image information D13 information pertaining to reference marks used in position correction when the additional information is to be restored, and outputs as image information D14.

The reference mark addition unit 115 is connected to a printer 116. When receiving the image information D14, this printer 116 forms the image information D14 on a printing medium and outputs as a printed image 117.

That is, the image processing apparatus according to this invention is characterized by comprising the resolution converting means (image forming unit 113) for converting an image into a predetermined resolution, the additional information multiplexing means (additional information multiplexer 114) for embedding additional information in the resolution-converted image, the reference mark adding means (reference mark addition unit 115) for adding, with a predetermined spacing, a frame having a width of at least one pixel to the perimeter of the image in which the additional information is embedded, and adding reference marks onto the frame at predetermined intervals, and the printing means (printer 116) for printing the image and the frame including the reference marks onto a printing medium.

The processing in this image processing apparatus is executed using a controller 20 shown in FIG. 2 explained in the first embodiment. That is, as shown in FIG. 2, a system bus 21 is connected to a CPU 22, ROM 23, RAM 24, and secondary storage device 25 such as a hard disk. Also, a display 26, keyboard 27, and mouse 28 are connected as user interfaces to the CPU 22 and the like. Furthermore, the printer 16 for image output is connected via an I/O interface 29.

Figure 23:
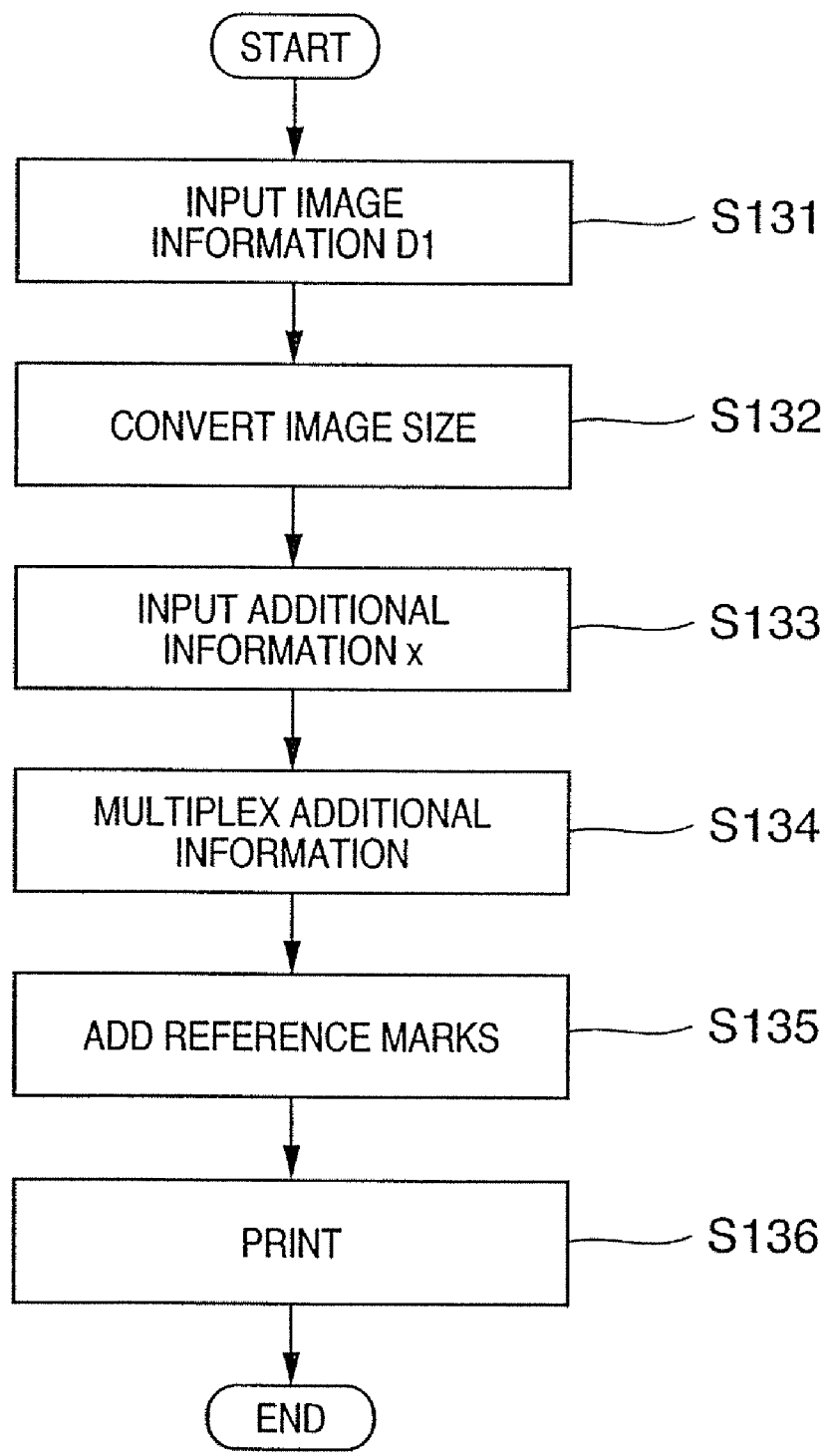
FIG. 23 is a flow chart for explaining the operation procedure of the image processing apparatus shown in FIG. 22.

FIG. 23 is a flow chart for explaining the operation procedure of the image processing apparatus shown in FIG. 22. First, image information D11 is input from the input terminal 111 shown in FIG. 22 (step S131). Next, the image forming unit 113 converts the input image information D11 into image information D12 having a size of H×W pixels as the resolution of printing (step S132). Also, additional information x is input from the input terminal 112 (step S133). This additional information x can be input simultaneously with the image information D11, or can be input beforehand.

The additional information multiplexer 114 segments the input image into square blocks each having N×N pixels, and changes the quantization threshold value of error diffusion in each block in accordance with the bit code of the additional information. By this processing, a texture which is not generated by normal error diffusion can be generated in each block, thereby embedding the additional information x in the image information D12 (step S134). Also, when this image information is decoded, the additional information x can be reclaimed by analyzing the frequency component of the texture.

Figure 24:
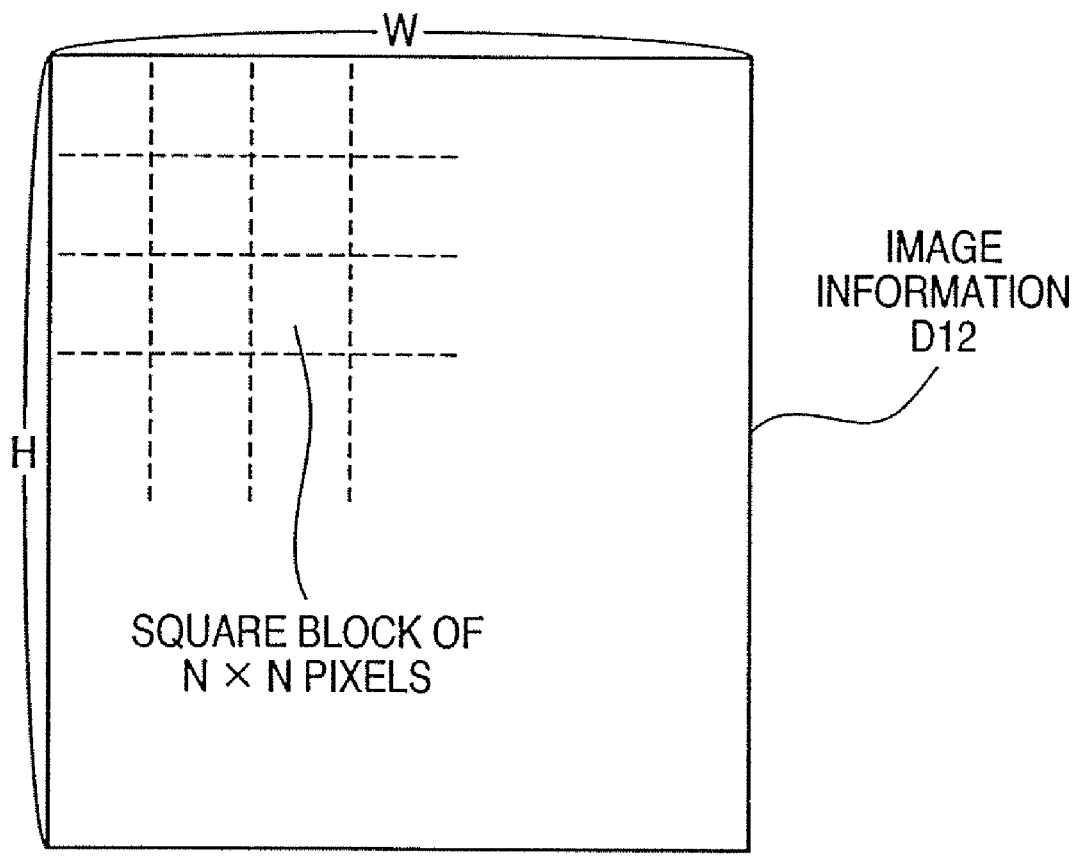
FIG. 24 is a schematic view for explaining N×N-pixel square blocks segmented in relation to image information D12 in an additional information multiplexer 114.

FIG. 24 is a schematic view for explaining the N×N-pixel square blocks segmented in relation to the image information D12 by the additional information multiplexer 114. In the present invention, the dimensions W and H of this image information D12 are defined as $$\begin{cases} W = w \cdot N \\ H = h \cdot N \end{cases}$$

where w and h are the numbers of blocks in the horizontal and vertical directions, respectively, of the image information D12, that is, integral multiples of N.

The reference mark addition unit 115 adds, to image information D13, information concerning reference marks for use in position correction when additional information is restored, and outputs as image information D14 (step S135). FIG. 25 is a schematic view for explaining the relationship between the reference marks and an image region when the image information is printed. As shown in FIG. 25, the reference mark addition unit 115 adds information concerning a reference frame 153 to the image information D13, such that when the image information is printed on a printing medium 151, this reference frame 153 having a line width of at least one pixel is printed around an image region 152. The reference mark addition unit 115 outputs the obtained image information as image information D14.

Figure 26:
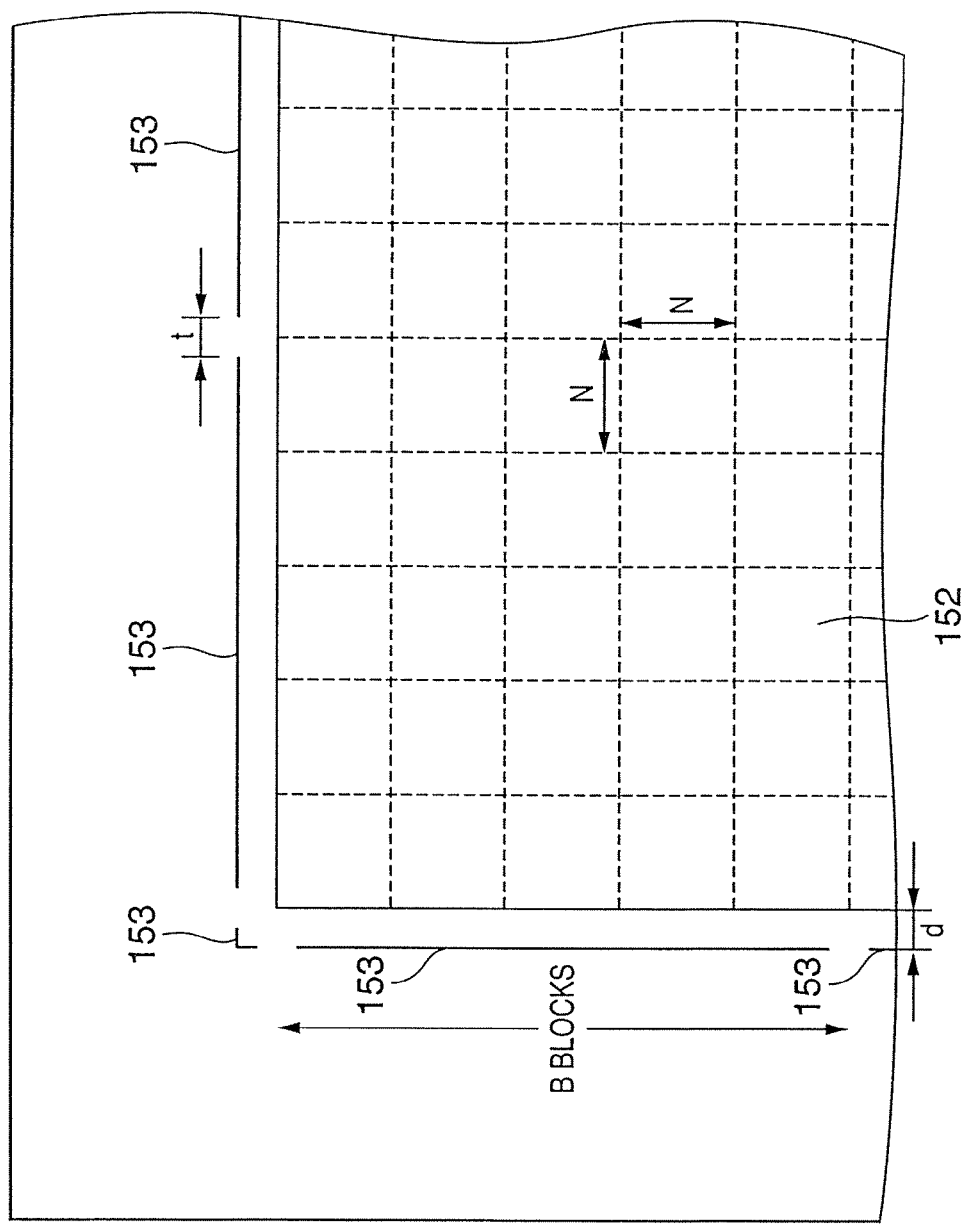
FIG. 26 is a schematic view for explaining details of a reference frame 153 added by a reference mark addition unit 115.

FIG. 26 is a schematic view for explaining details of the reference frame 153 added by the reference mark addition unit 115. As shown in FIG. 26, this reference frame 153 is formed at a distance of d pixels from the image region 152. In addition, t-pixel gaps are attached at intervals of B blocks to the reference frame 153. This gap is called a reference mark used in position correction when additional information is restored. These gaps require intervals of at least one pixel.

The reference frame 153 is formed at a distance of d pixels from the image region in order to prevent erasure of the reference marks (gaps) by ink blur or the like when the reference frame is formed for image information D13 having very high density.

The printer 116 prints the image information D14 formed by the reference mark addition unit 115 onto the printing medium 151, and outputs as a printed image 117 (step S136). This printer 116 is, e.g., an inkjet printer or laser printer capable of expressing a tone by using pseudo halftoning.

Figure 27:
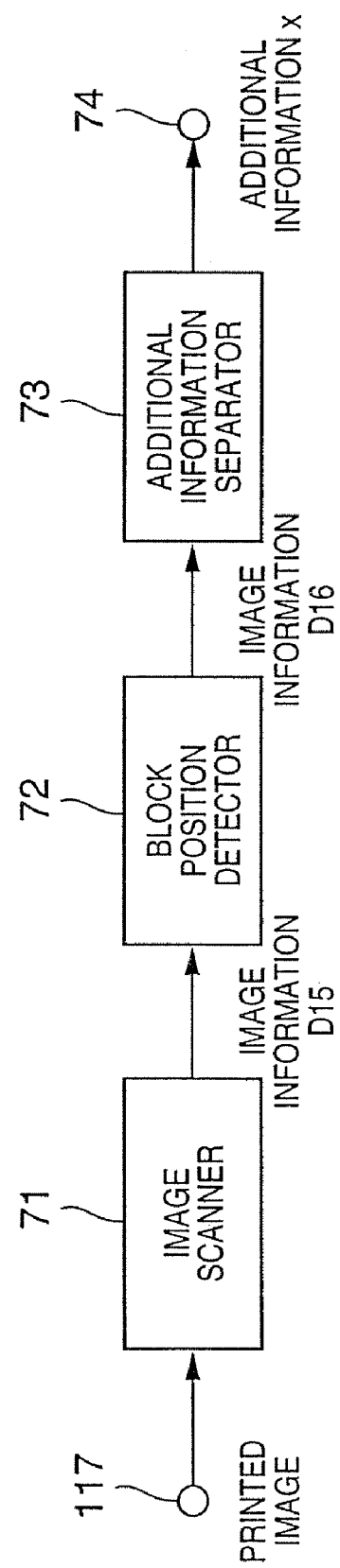
FIG. 27 is a block diagram for explaining the arrangement of an image processing apparatus for inputting a printed image by an image scanner and extracting additional information, according to an embodiment of the present invention.
Figure 28:
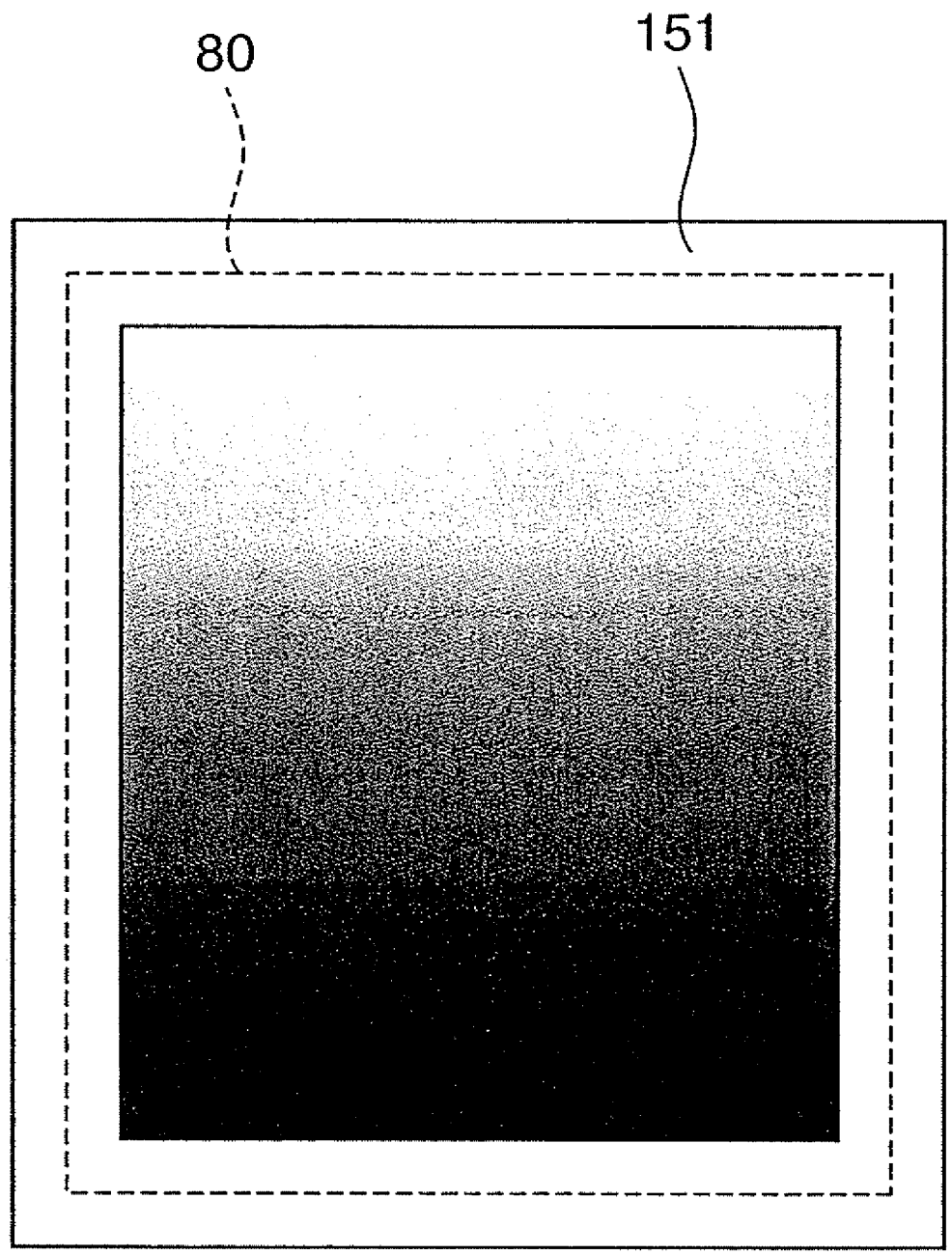
FIG. 28 is a schematic view for explaining an image read by an image scanner 71.

FIG. 27 is a block diagram for explaining the arrangement of an image processing apparatus for inputting a printed image by using an image scanner and extracting embedded additional information, according to an embodiment of the present invention. Referring to FIG. 27, an image scanner 71 optically reads the printed image 117 printed by the image processing apparatus shown in FIG. 22 and converts the read image into image information D15. FIG. 28 is a schematic view for explaining the range of an image read by the image scanner 71. As shown in FIG. 28, when the printing medium 151 output as the printed image 117 is input to this image scanner 71, a range indicated by a scanner read range 80 containing the image region and a partial printing medium region is optically read and output as the image information D15.

Figure 29:
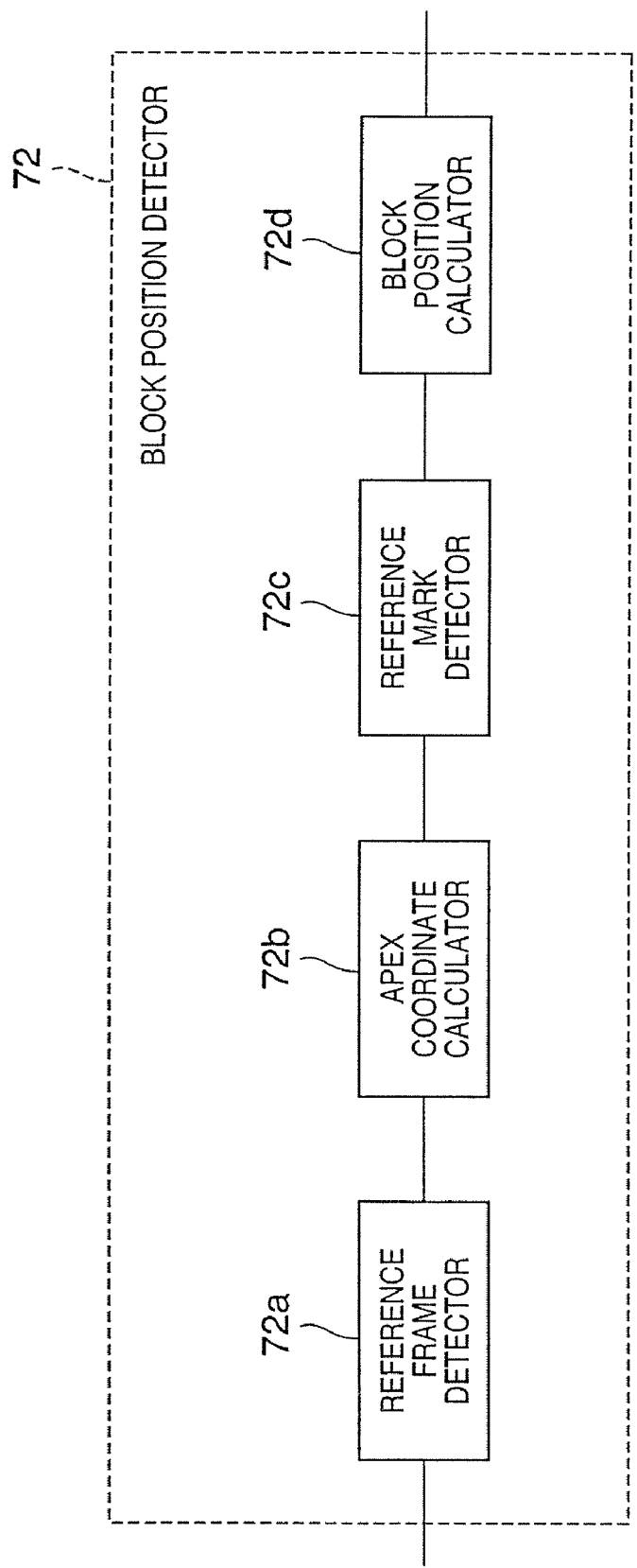
FIG. 29 is a block diagram showing details of the arrangement of a block position detector 72.

The image scanner 71 is connected to a block position detector 72. This block position detector 72 calculates accurate positions of the blocks segmented by the additional information multiplexer 114. FIG. 29 is a block diagram showing details of the arrangement of this block position detector 72.

As shown in FIG. 29, the block position detector 72 includes a reference frame detector 72a, apex coordinate calculator 72b, reference mark detector 72c, and block position calculator 72d.

The reference frame detector 72a uses a known edge detection filter to detect the edges of a rectangular image region. The apex coordinate calculator 72b calculates the apex coordinates of the image region by using the edge information detected by the reference frame detector 72a. The reference mark detector 72c detects the positions of all reference marks on the reference frame 153. On the basis of the detected reference marks, the block position calculator 72d calculates information concerning the positions of all blocks in the image region, thereby specifying the size of the image region. In addition, the image is converted into the image size before printing by correcting image distortion.

Information of the calculated block positions and the like are input to an additional information separator 73 connected to the block position detector 72. This additional information separator 73 analyzes the frequency of the texture on the image block by block, thereby separating and restoring the additional information x. The additional information separator 73 is connected to an output terminal 74.

Similar to the image processing apparatus shown in FIG. 22, the processing in the image processing apparatus shown in FIG. 27 is also executed by using the controller 20 shown in FIG. 2.

That is, the image processing apparatus of this invention comprises the optical reading means (image scanner 71) for optically reading a printing medium on which an image having additional information embedded in it is printed, and the separating/restoring means (additional information separator 73) for separating and restoring the additional information from the read image. This image processing apparatus is characterized by further comprising the frame detecting means (reference frame detector 72a) for detecting a frame which includes reference marks arranged at predetermined intervals around an image region printed on the printing medium, the apex specifying means (apex coordinate calculator 72b) for specifying the apexes of the image region on the basis of the detected frame, the reference mark detecting means (reference mark detector 72c) for detecting reference marks between two adjacent apexes in turn from the side of one apex, and the image region calculating means (block position calculator 72d) for calculating the size of the image on the basis of the detected reference marks.

Figure 30:
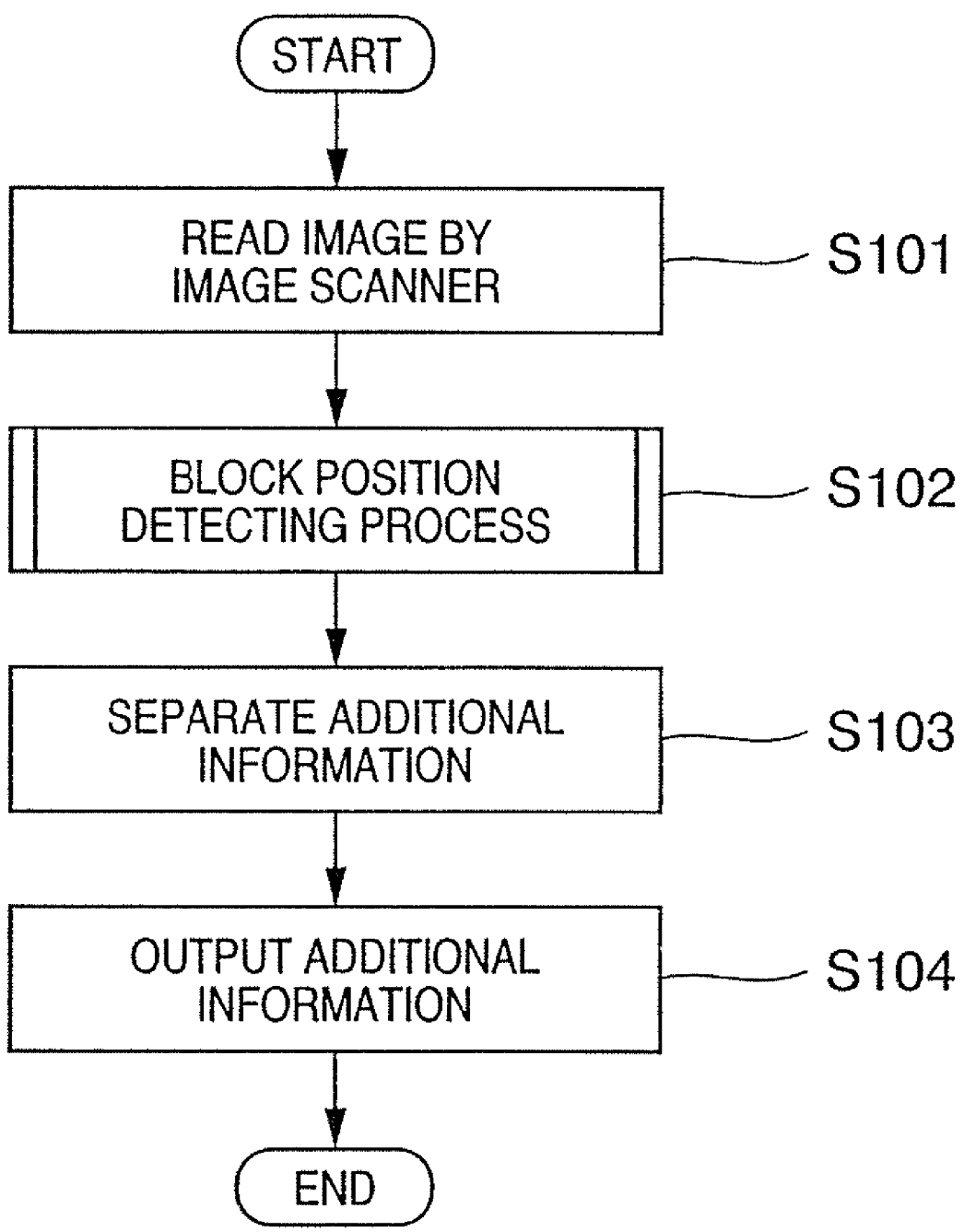
FIG. 30 is a flow chart for explaining the operation procedure of an image processing apparatus for inputting a printed image 117 by an image scanner and extracting additional information x.

FIG. 30 is a flow chart for explaining the operation procedure of the image processing apparatus which inputs the printed image 117 by the image scanner and extracts the additional information x. First, the image scanner 71 optically reads the printed image 117 to obtain image information D15 (step S101). Subsequently, the block position detector 72 detects block positions in this image information D15 (step S102). The process procedure in this block position detector 72 will be described in detail below.

Figure 31:
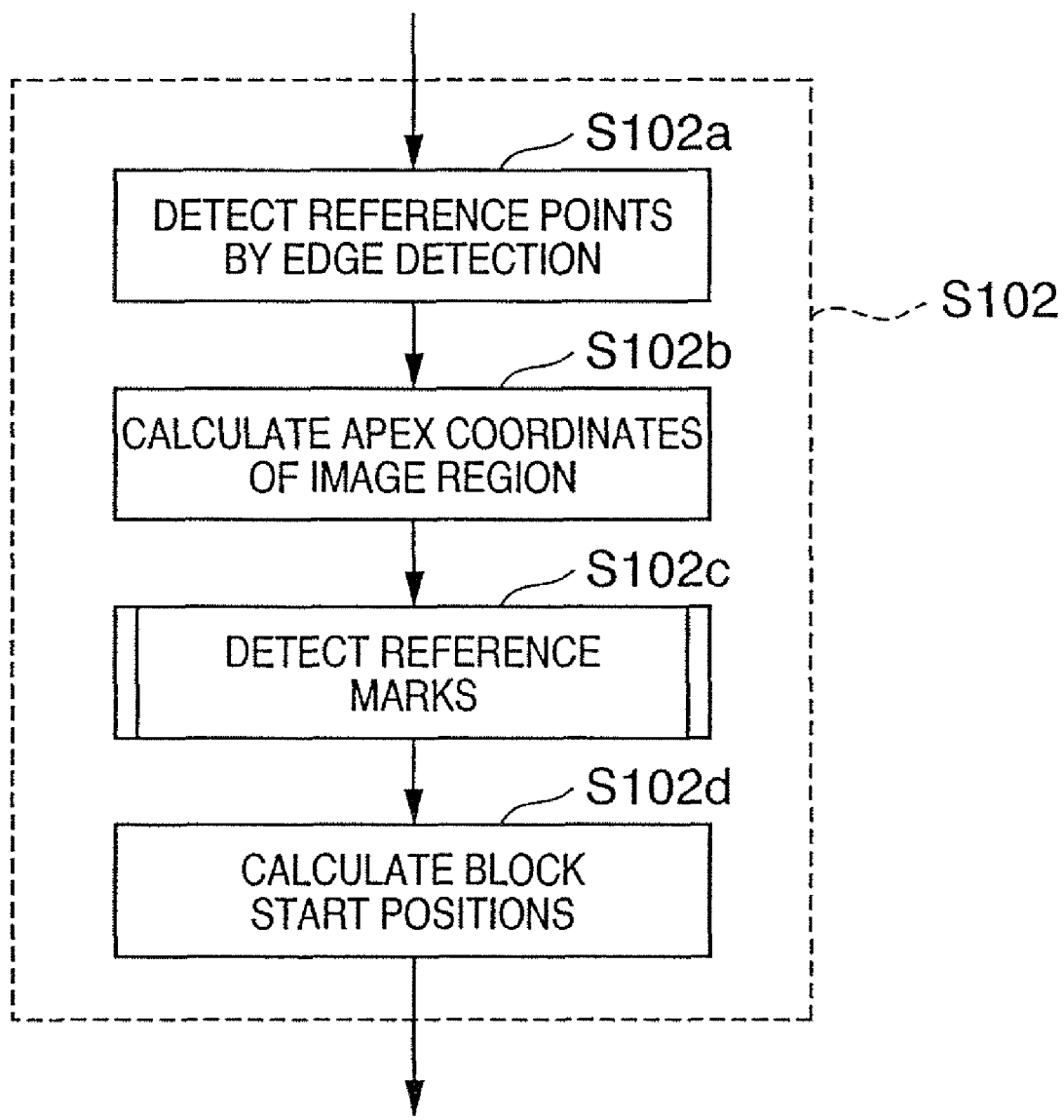
FIG. 31 is a flow chart for explaining the operation procedure of each unit in the block position detector 72 having the arrangement shown in FIG. 29.
Figure 32:
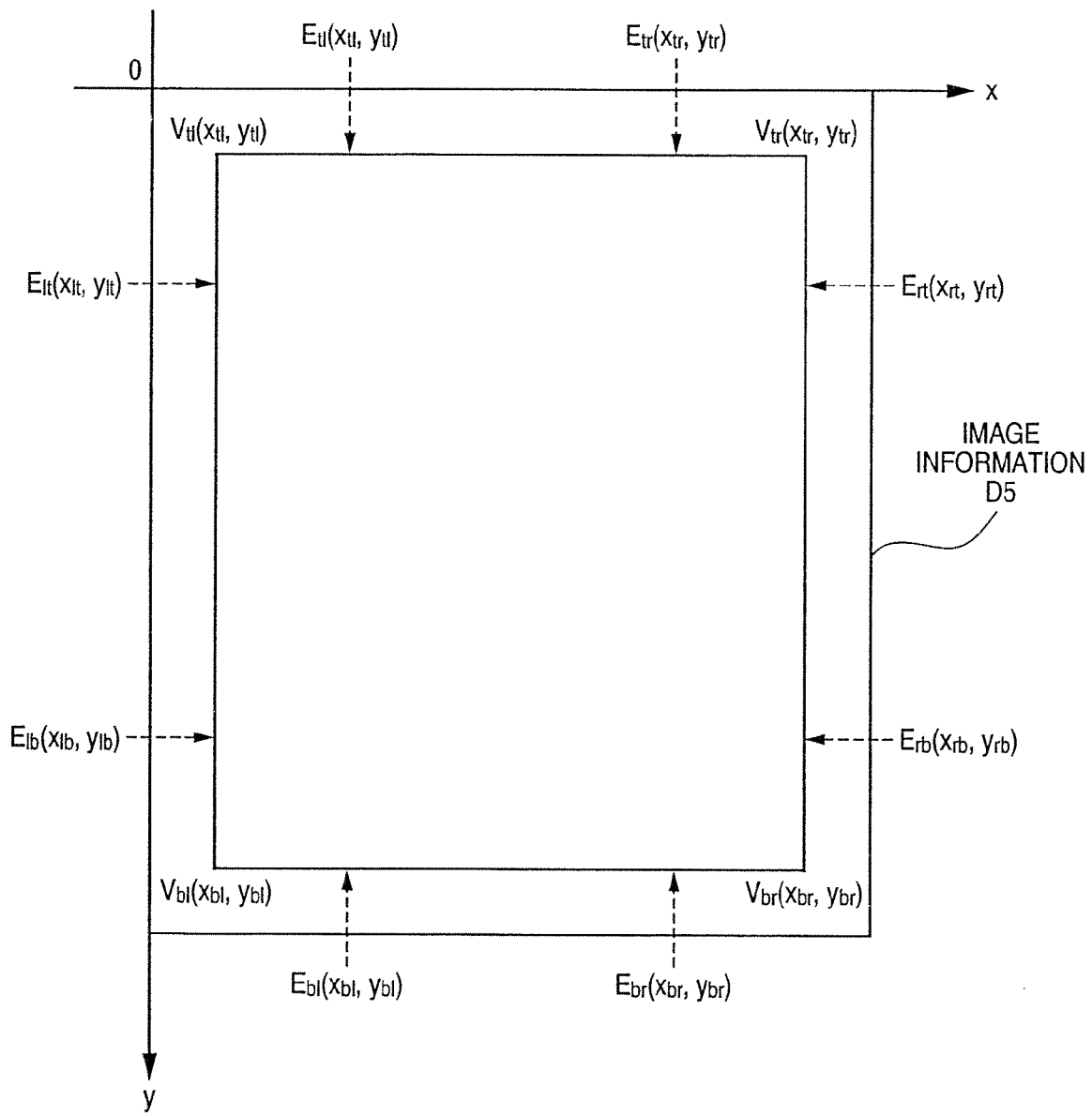

FIG. 31 is a flow chart for explaining the operation procedure of each unit in the block position detector 72 having the arrangement shown in FIG. 29. First, from the image information D15 as an image obtained by reading the printed image 117, the reference frame detector 72a detects the edges of a rectangular image region by using a known edge detection filter, thereby obtaining the coordinates of eight reference points meeting preset conditions on the edges (step S102a). FIG. 32 is a view for explaining these eight reference points on the edges obtained by the reference frame detector 72a.

In this embodiment as shown in FIG. 32, two reference points are set beforehand on each side, and a total of eight reference points on the edges are detected. Referring to FIG. 32, $E_{tl}(x_{tl},y_{tl})$, $E_{tr}(x_{tr},y_{tr})$, $E_{rt}(x_{rt},y_{rt})$, $E_{rb}(x_{rb},y_{rb})$, $E_{lt}(x_{lt},y_{lt})$, $E_{lb}(x_{lb},y_{lb})$, $E_{bl}(x_{bl},y_{bl})$, and $E_{br}(x_{br},y_{br})$ are these eight reference points. For example, $E_{tl}(x_{tl},y_{tl})$ and $E_{tr}(x_{tr},y_{tr})$ are obtained as edge pixels at given distances set from the left- and right-hand sides, respectively, on the upper edge of the image information D15 as a scanned image. These points can also be edge pixels at given distances set not from the left- and right-hand sides but from the central line of the image toward the left- and right-hand sides. Other reference points are also similarly obtained.

Next, the apex coordinate calculator 72b calculates the apex coordinates $V_{tl}(x_{tl},y_{tl})$, $V_{tr}(x_{tr},y_{tr})$, $V_{bl}(x_{bl},y_{bl})$ and $V_{br}(x_{br},y_{br})$ of the image region by using the obtained eight reference points on the reference frame 153 (step S102b). More specifically, equations of straight lines are calculated from the two reference points on each side, and the coordinates of the intersections of these straight lines are calculated as the coordinates of the apexes.

Figure 33:
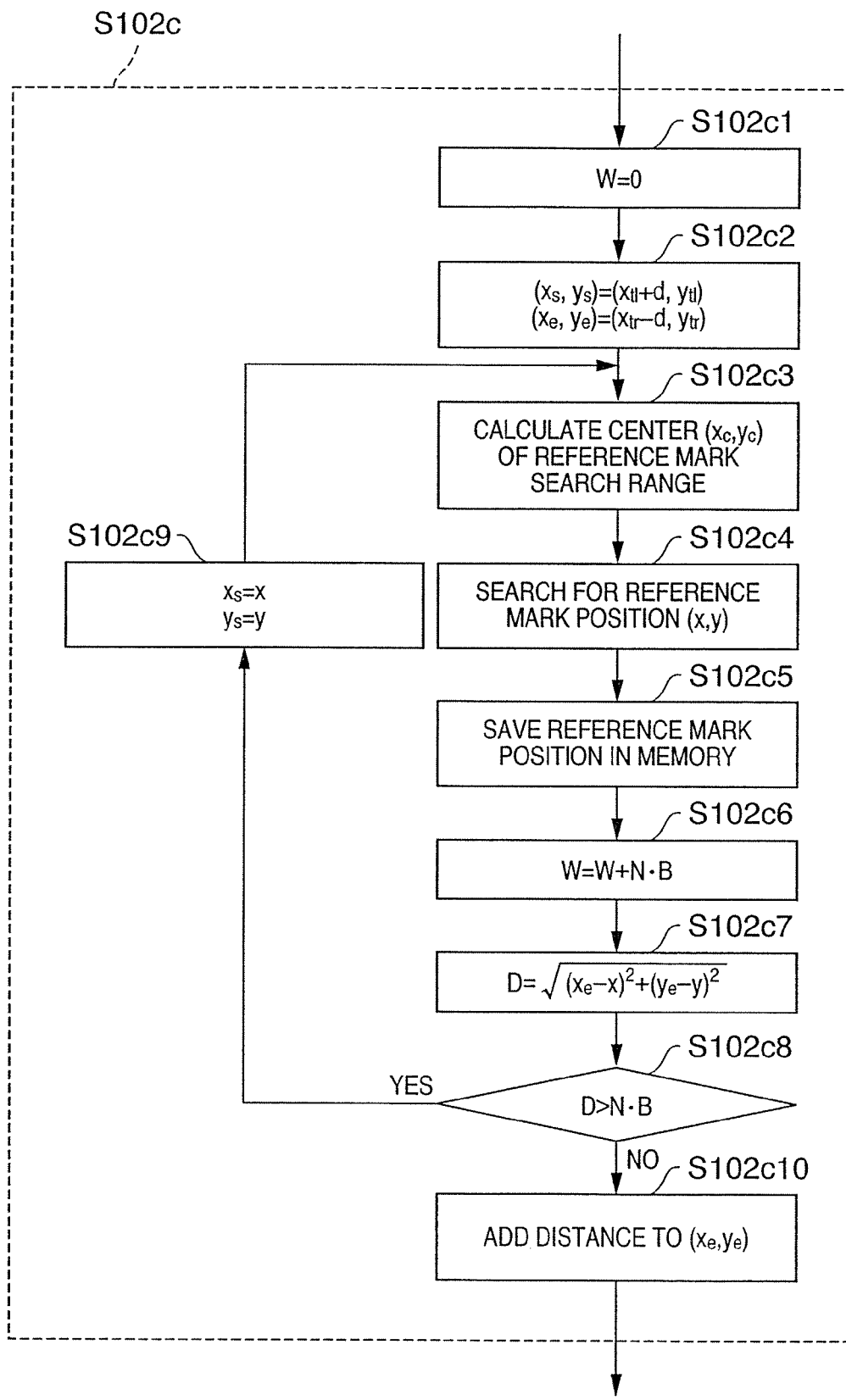
FIG. 33 is a flow chart for explaining the process procedure of a reference mark detector 72c.

In addition, the reference mark detector 72c detects reference marks on the basis of the calculated coordinates of the four apexes (step S102c). Details of step S102c will be described below with reference to FIG. 33. FIG. 33 is a flow chart for explaining the process procedure of this reference mark detector 72c. As a practical example, only the process of detecting marks present on the upper side of the image region will be explained.

First, the reference mark detector 72c initializes the variable W, which indicates the width of the image information in which the additional information is embedded, to W=0 (step S102c1). The reference mark detector 72c then initializes in step S102c2 the coordinates $(x_s,y_s)$ and $(x_e,y_e)$ of the start and end positions, respectively, of processing as indicated by $$(x_s,y_s)=(x_{tl}+d,y_{tl})$$

$$(x_e,y_e)=(x_{tr}-d,y_{tr})$$

Figure 34:
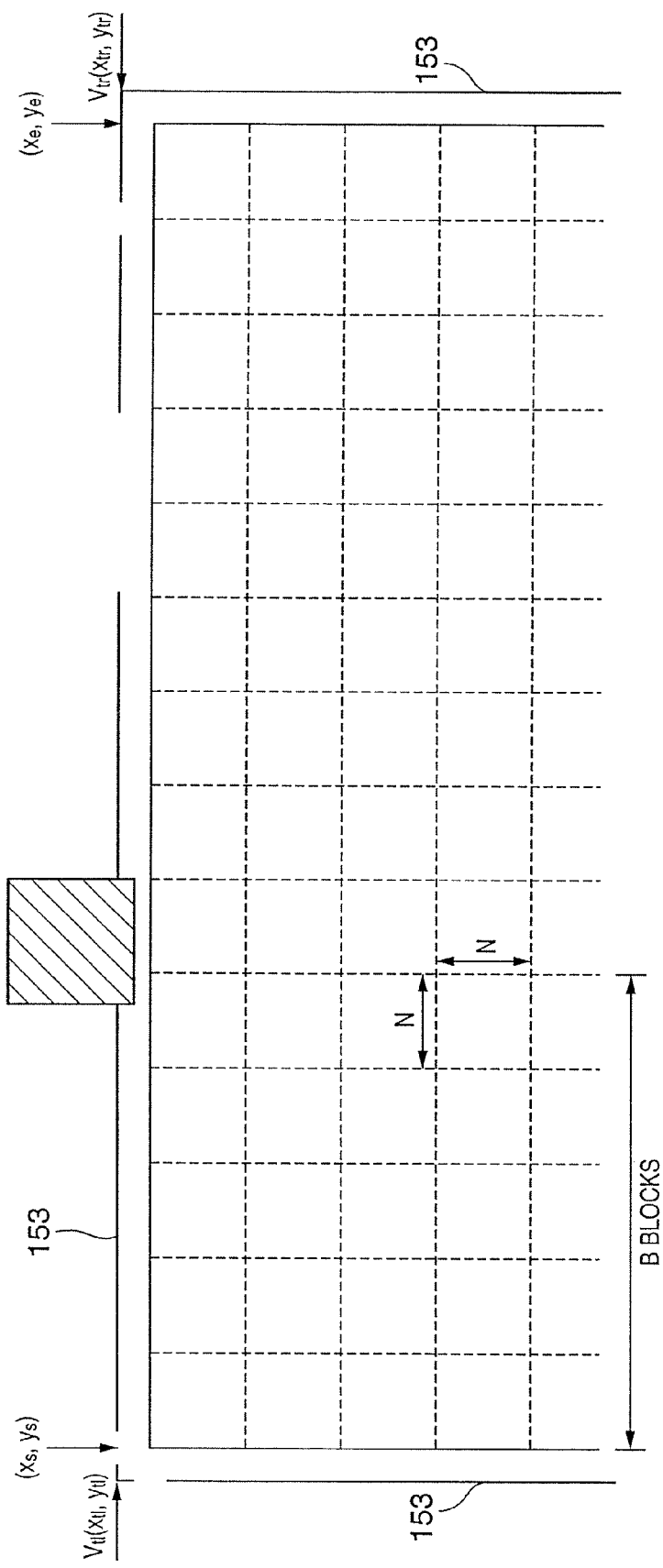
FIG. 34 is a schematic view for explaining the relationship between a reference frame 53 and an image region.

FIG. 34 is a schematic view for explaining the relationship between the reference frame 153 and the image region. In the above equations, as shown in FIG. 34, the coordinates $(x_s,y_s)$ and $(x_e,y_e)$ of the start and end positions are the coordinates of the upper left and right apexes, respectively, of the reference frame 153, and d is the distance between the reference frame 153 and the image region.

Figure 35:
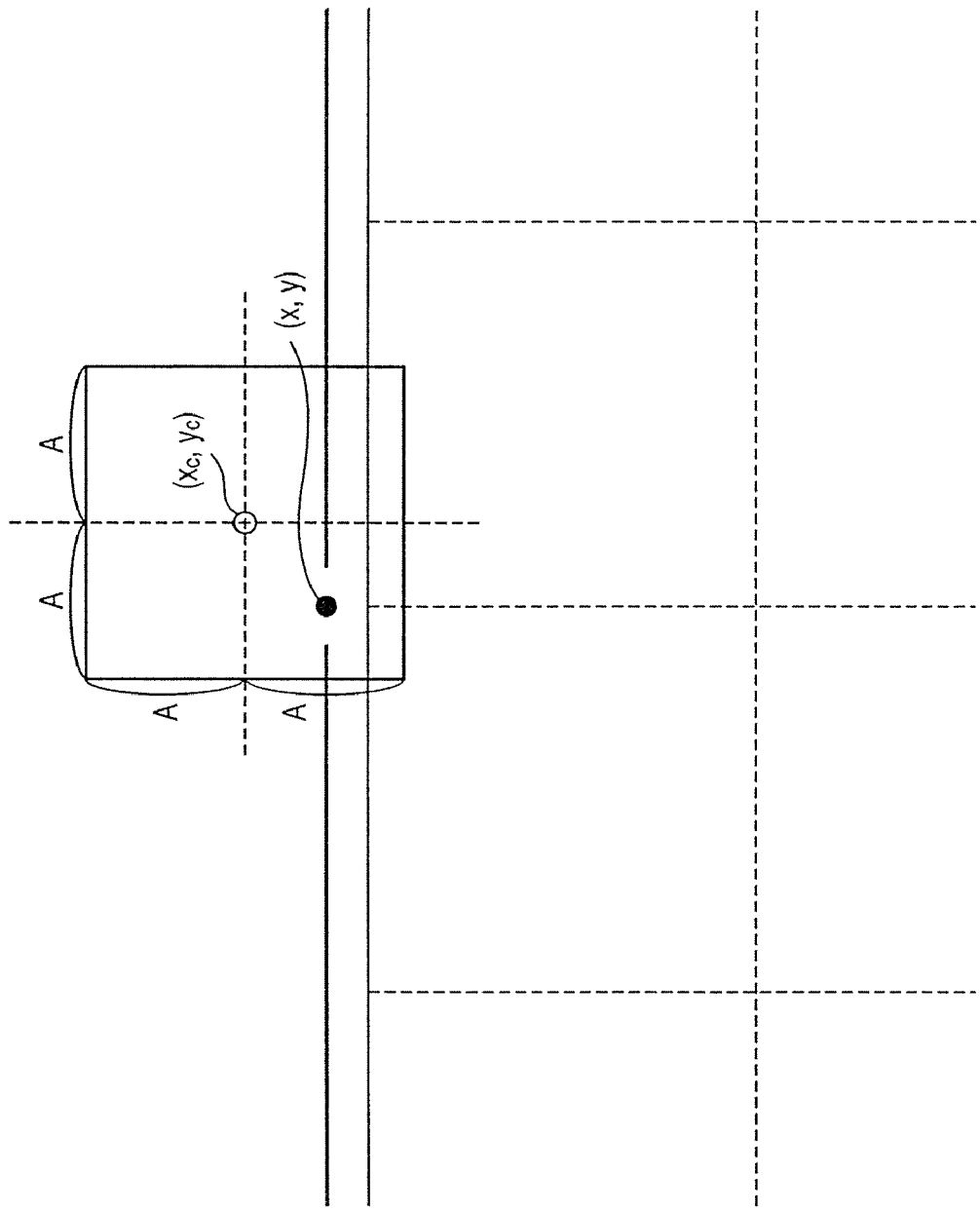
FIG. 35 is a schematic view for explaining the center coordinates $(x_c, y_c)$ of a search range for detecting a reference mark.

Subsequently, the reference mark detector 72c calculates the coordinates $(x_s,y_s)$ of the center of a search range for detecting a reference mark (step S102c3). FIG. 35 is a schematic view for explaining this center coordinates $(x_c,y_c)$ of the search range for detecting a reference mark. Referring to FIG. 35, coordinates (x,y) are the coordinates of a reference mark.

The following equations hold for the coordinates $(x_s,y_s)$ obtained in step S102c2, for the size N of a block in which a bit of the additional information is embedded, and for the interval B of a block to which a reference mark is added.

$$\begin{cases} y_c - y_s = \dfrac{y_e \cdot y_s}{x_e - x_s}(x_c - x_s) \\ (N \cdot B)^2 = (x_c - x_s)^2 + (y_c - y_s)^2 \end{cases}$$

Solving the above equations for $(x_c, y_c)$ yields $$\begin{cases} x_c = \sqrt{\dfrac{N^2 B^2}{1 + \left(\dfrac{y_e - y_s}{x_e - x_s}\right)}} + x_s \\ y_c = \dfrac{y_e - y_s}{x_e - x_s}(x_c - x_s) + y_s \end{cases}$$

From the above equations, the coordinates $(x_c, y_c)$ of the center of the reference mark search range can be calculated.

On the basis of these coordinates $(x_c, y_c)$, a reference mark is detected (step S102c4). In this embodiment, as shown in FIG. 35, the reference mark search range is a square block of 2A×2A pixels having the reference position $(x_c, y_c)$ as its center. By using a filter indicated by the following equation, a position at which an output value when this filter is used is a maximum is set as a reference mark position (x,y) (step S102c4).

$$f(9) = [-1, -1, -1, 0, 6, 0, -1, -1, -1]$$

That is, the image processing apparatus according to this invention is characterized in that the reference mark detecting means (reference mark detector 72c) comprises the search region setting means for setting a reference mark search region having a predetermined size between two adjacent apexes in order from an apex as a start point, and the reference mark detecting means for detecting, as a reference mark, the position of a pixel at which an output value when the enhancement filter is used is a maximum.

After calculating the position (x,y) of a reference mark, the reference mark detector 72c temporarily stores the calculated position in the RAM 24 shown in FIG. 2 or the like (step S102c5). Additionally, the reference mark detector 72c updates the value of the variable W, which indicates the width of the image region, to W=W+N×B (step S102c6).

Subsequently, the reference mark detector 72c calculates a distance D between the coordinates $(x_e, y_e)$ and the reference mark position (x,y) by $$D = \sqrt{(x_e - x)^2 + (y_e - y)^2}$$

The reference mark detector 72c then checks in step S102c8 whether this reference mark is the last mark by $$D > N \cdot B$$

If the above equation is met (YES), the reference mark detector 72c determines that the obtained reference mark is not the last mark, and stores the values of (x,y) in $(x_s, y_s)$ (step S102c9). After that, the flow returns to step S102c3. If the above equation is not met in step S102c8 (NO), the reference mark detector 72c determines that the obtained reference mark is the last mark, and adds the distance to $(x_e, y_e)$ (step S102c10). In this manner, the processing by the reference mark detector 72c is completed.

By the above processing, the value of W is increased by N×B whenever a reference mark is detected, and finally the distance between the last reference mark position and $(x_e, y_e)$ is added. Therefore, the size of the image region in the image information D15 can be accurately calculated.

Note that exactly the same processing is performed for the bottom side, left-hand side, and right-hand side of the image region.

The image processing apparatus according to this invention is characterized in that the reference mark detecting means (reference mark detector 72c) further comprises the distance calculating means for calculating the distance between a detected reference mark and an apex as an end point, the determining means for determining whether the calculated distance is equal to or larger than a predetermined threshold value, the first integrating means which, if the calculated distance is equal to or larger than the predetermined threshold value, calculates an integrated distance by multiplying the number of reference marks, from a reference mark detected first to a reference mark detected last, by the size of a block in which additional information is embedded, and the second integrating means which, if the calculated distance is smaller than the predetermined threshold value, calculates the size of the image by further adding, to the integrated distance, the distance from the last detected reference mark to the apex as the end point.

Figure 36:
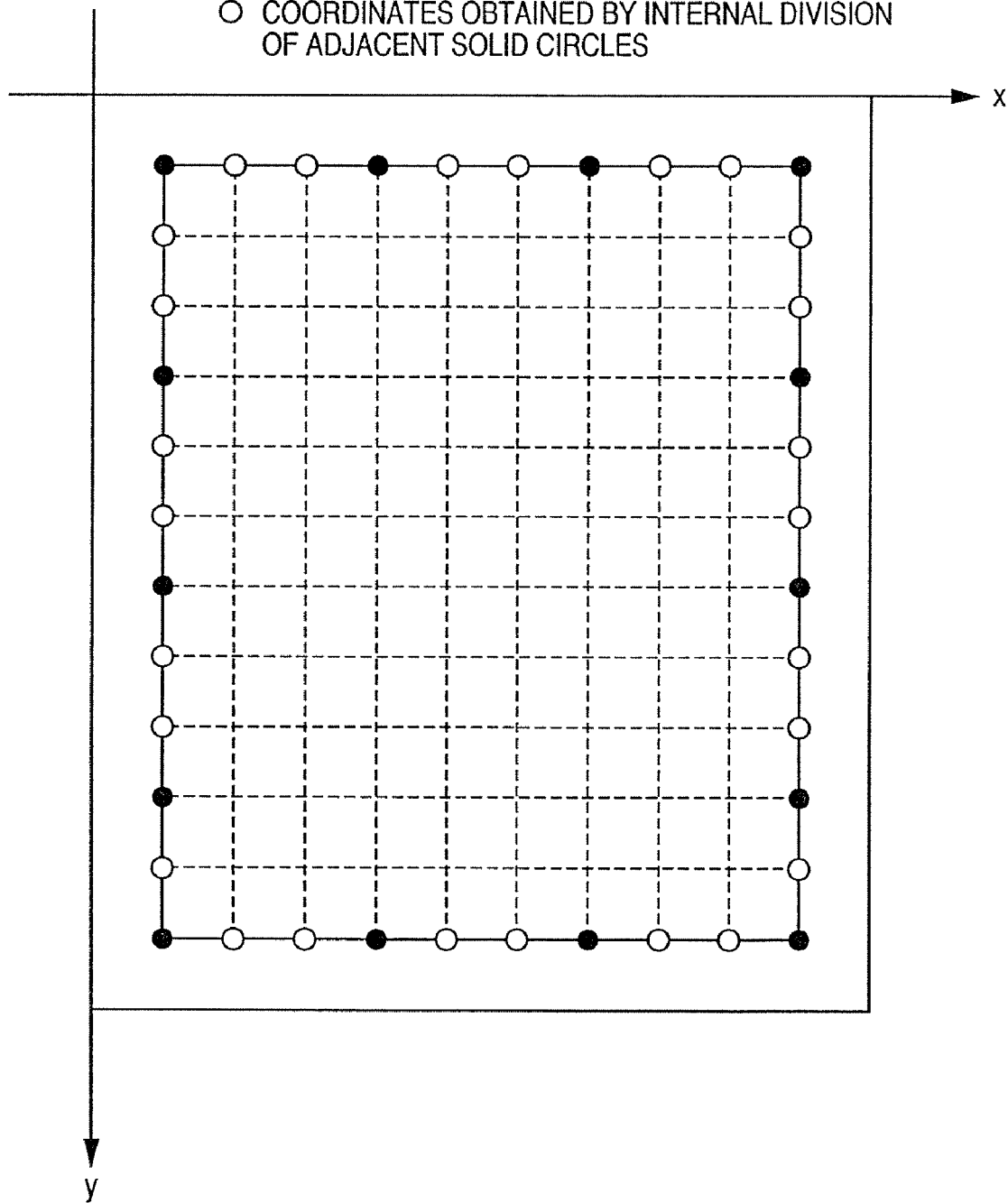
FIG. 36 is a view for explaining coordinate positions for calculating block positions in a block position calculator 72d.

When all the reference marks on the reference frame 153 are completely detected, the block position calculator 72d calculates block positions (step S102d). FIG. 36 is a view for explaining coordinate positions for calculating block positions in the block position calculator 72d. By using those reference marks indicated by solid circles in FIG. 36, which are already subjected to position detection for every B blocks, the block position calculator 72d calculates remaining block start positions between adjacent solid circles. The remaining block start position means the coordinates of the upper left point of each block indicated by an open circle in FIG. 36. A known internally dividing point calculation formula is used as this calculation method.

Figure 37:
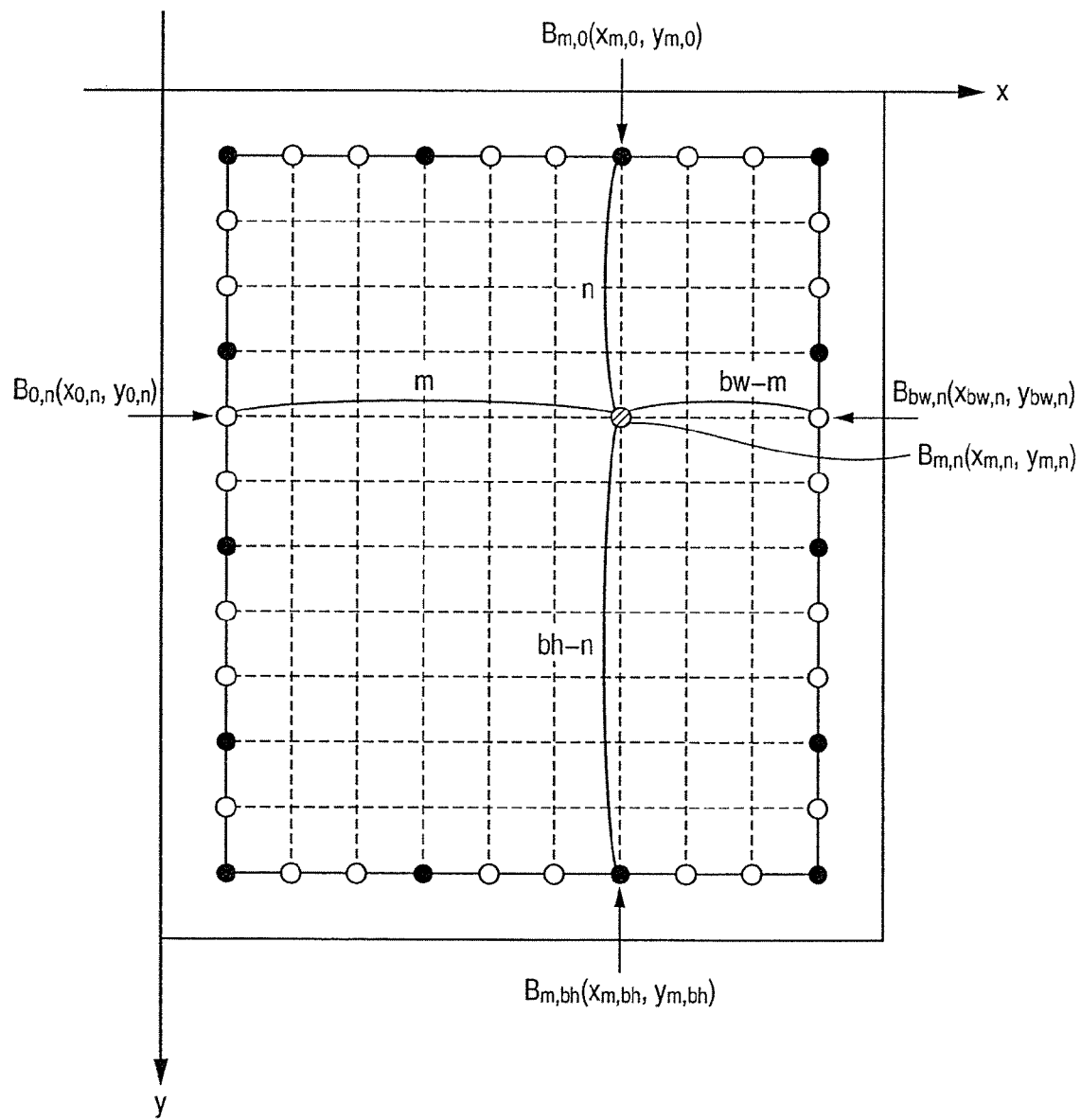
FIG. 37 is a view for explaining a method used in this embodiment to calculate the coordinates of an internal block start position $B_{m,n}(x_{m,n}, y_{m,n})$.
Figure 38:
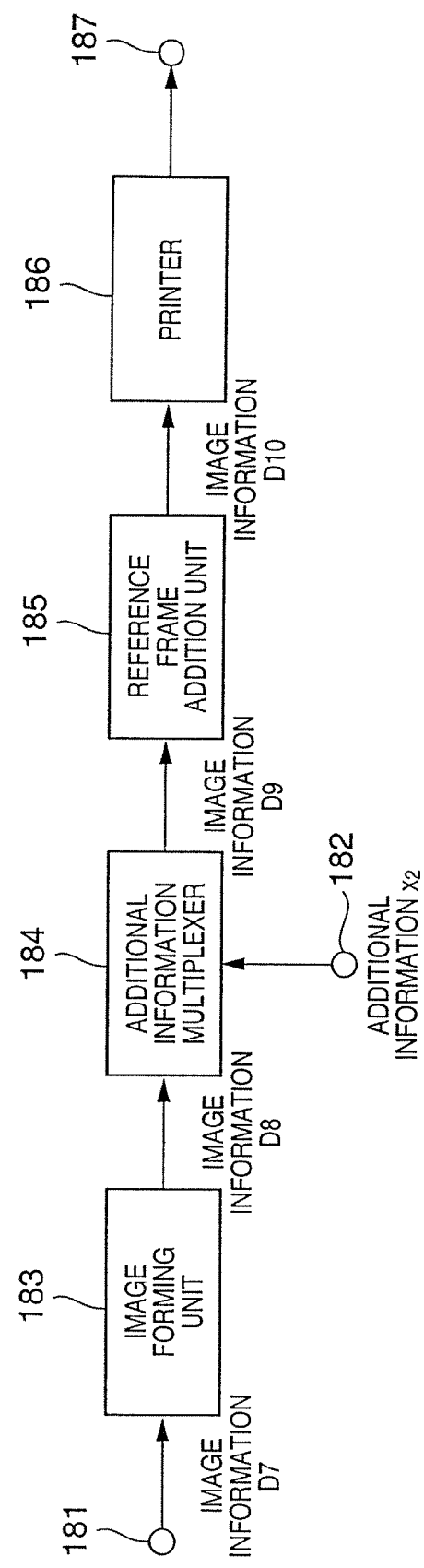
FIG. 38 is a block diagram showing the arrangement of a previously proposed image processing apparatus which embeds additional information in an image and prints the image by adding a reference frame.
Figure 39:
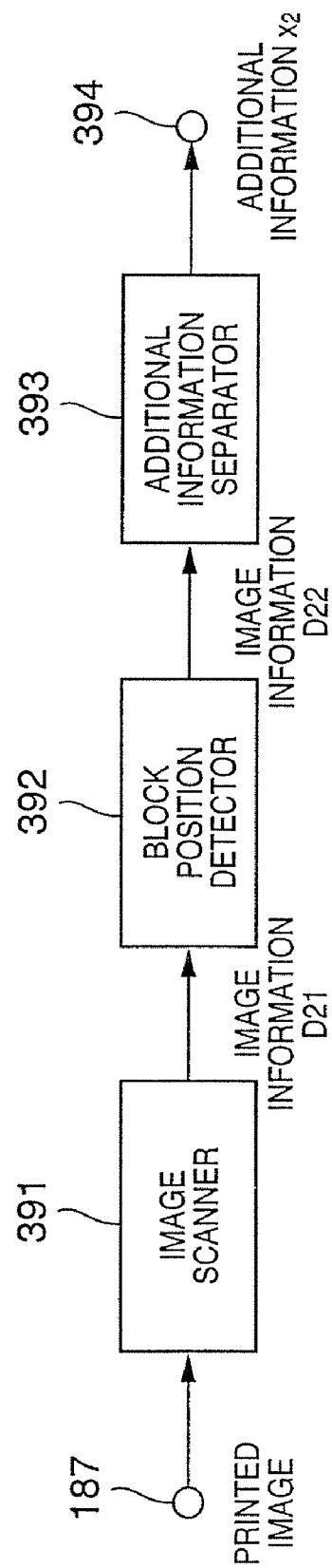
FIG. 39 is a block diagram showing the arrangement of a previously proposed image processing apparatus which reads a printed image and extracts additional information.

After calculating all block start positions on the reference frame 153 by the above method, the block position calculator 72d calculates the upper left coordinate positions of all blocks in the image region by using the coordinates of these block start positions. FIG. 37 is a view for explaining a method of calculating the coordinates of an internal block start position $B_{m,n}(x_{m,n}, y_{m,n})$ used in this embodiment. As shown in FIG. 37, the four coordinate points obtained on the reference frame 153 are used to calculate the start position $B_{m,n}(x_{m,n}, y_{m,n})$ of the (m,n)th block by $$(x_{m,n}, y_{m,n}) = \left( \frac{n \cdot x_{m,bh} + (bh - n) \cdot x_{m,0}}{bh}, \frac{m \cdot y_{bw,n} + (bw - m) \cdot y_{0,n}}{bw} \right)$$

The above equation means that the x-coordinates of the start position of the (m,n)th block are calculated by using only the x-coordinates of reference points on the upper and lower sides of the reference frame 153, and the y-coordinates of this block start position are calculated by using only the y-coordinates of reference points on the left- and right-hand sides of the reference frame 153. This coordinate calculation method is used for the reasons explained below.

In common popular type, inexpensive flat bed scanners, image distortion caused by a carriage driving system mainly appears in the sub-scan direction, and its distortion amount is constant in the main scan direction. That is, for distortion like this, position correction in the sub-scan direction need only be performed using only the reference marks on the left- and right-hand sides.

Also, image distortion caused by an optical system primarily appears only in the main scan direction, and its distortion amount is constant in the sub-scan direction. For distortion like this, therefore, position correction in the main scan direction need only be performed using only reference marks on the upper and lower sides.

For the above reasons, most distortion of an image read by a popular type, inexpensive flat bed scanner can be removed by the block position calculation method as described above in this embodiment, so block positions can be detected very accurately.

That is, the image processing apparatus according to this embodiment is characterized by comprising the converting means for converting, on the basis of the calculated image size, an image read by the optical reading means into the image size before the image is printed on a printing medium.

The block start position $B_{m,n}(x_{m,n}, y_{m,n})$ calculated by the above method and the image information D15 read by the image scanner 71 are input as image information D16 to the additional information separator 73. On the basis of the calculated block start position information, this additional information separator 73 analyzes the frequency characteristic of the texture on the image block by block, and separates the additional information x (step S103). The separated and restored additional information x is output from the output terminal 74 (step S104).

In this embodiment, a reference frame is formed around image information, and gaps of several pixels are formed on this reference frame. However, the present invention is not limited to this method. That is, a linear or dot-like scale can be formed by reference marks in a visible state around image information and detected by the reference mark detector 72c. This scale can also be printed by using a relatively quiet recording material such as yellow ink and detected by the reference mark detector 72c.

That is, the image processing apparatus according to the present invention is characterized in that reference marks form a dot-like scale, and that these reference marks are formed by a color close to the color of the printing surface of a printing medium.

The present invention can be applied to a system constituted by a plurality of devices (e.g., a host computer, interface, reader, and printer) or to an apparatus (e.g., a copying machine or facsimile apparatus) comprising a single device.

Further, the objects of the present invention can also be achieved by supplying a recording medium (or storage medium) recording program codes of software for implementing the functions of the above embodiments to a system or apparatus, and reading out and executing the program codes stored in the recording medium by a computer (or a CPU or MPU) of the system or apparatus. In this case, the program codes read out from the storage medium implement the functions of the above embodiments, and the recording medium storing these program codes constitutes the invention. Furthermore, besides the functions of the above embodiments are implemented by executing the readout program codes by the computer, the present invention includes a case where an OS (Operating System) or the like running on the computer performs part or the whole of actual processing in accordance with designations by the program codes and thereby implements the functions of the above embodiments.

Furthermore, the present invention also includes a case where the program codes read out from the recording medium are written in a memory of a function extension card inserted into the computer or of a function extension unit connected to the computer, and, in accordance with designations by the program codes, a CPU or the like of the function extension card or function extension unit performs part or the whole of actual processing and thereby implements the functions of the above embodiments.

When the present invention is applied to the recording medium described above, this recording medium stores program codes corresponding to the flow charts explained previously.

In the present invention as has been described above, from image information containing distortion produced when an image on a printing medium is optically read, it is possible to calculate an accurate size of the original image information and restore highly accurate additional information.

The present invention is not limited to the above embodiments and various changes and modifications can be made within the spirit and scope of the present invention. Therefore, to apprise the public of the scope of the present invention, the following claims are made.

What is claimed is:

1. An image processing apparatus for embedding additional information into image information, the image processing apparatus comprising:
    an additional information embedding unit configured to embed the additional information into the image information to produce integrated information which represents an information-embedded image in which the additional information is embedded at a position;
    a frame adding unit configured to add frame information to the integrated information, the frame information representing a reference frame peripheral to the information-embedded image, and the reference frame being used to detect, in the information-embedded image, the position at which the additional information is embedded; and
    a printing unit configured to print, on a printing medium, the information-embedded image with the reference frame based on the integrated information to which the frame information is added.

2. The image processing apparatus according to claim 1, wherein the reference frame is formed by a line.

3. The image processing apparatus according to claim 1, further comprising a resolution converting unit to convert an original image information into the image information so that a first resolution of an original image represented by the original image information is changed to a second resolution of an image represented by the image information.

4. The image processing apparatus according to claim 1, wherein the frame information is added so that the reference frame is located at a predetermined distance from an edge of the information-embedded image.

5. The image processing apparatus according to claim 2, wherein the reference frame is formed by a line and a gap, the gap being used to separate the integrated information as a reference mark.

6. The image processing apparatus according to claim 5, wherein there are plural gaps and the gaps are located at a predetermined interval in the line.

7. The image processing apparatus according to claim 1, wherein the reference frame is used to detect, in the information-embedded image, a block where the additional information is separated from the integrated information.

8. The image processing apparatus according to claim 7, wherein the additional information embedding unit embeds the additional information by changing a threshold in error diffusion in the block.

9. An image processing apparatus comprising:
    an input unit configured to input image information;
    a reference frame detection unit configured to detect an reference frame in an image represented by the input image information, the reference frame being formed at a circumferential to the image;
    a position detection unit configured to detect, in the image, a position where additional information is separated from the image information; and an additional information separation unit configured to separate the additional information from the image information at the detected position.

10. The image processing apparatus according to claim 9 further comprising:
an apex coordinate calculation unit configured to calculate an apex based on the detected reference frame,
wherein the additional information separation unit separates the addition information from the image according to the calculated apex.

11. An image processing method for embedding additional information into image information, the image processing method comprising:
an additional information embedding step of embedding the additional information into the image information to produce integrated information which represents an information-embedded image in which the additional information is embedded at a position;
a frame adding step of adding frame information to the integrated information, the frame information representing a reference frame peripheral to the information-embedded image, and the reference frame being used to detect, in the information-embedded image, the position at which the additional information is embedded; and
a printing step of printing, on a printing medium, the information-embedded image with the reference frame based on the integrated information to which the frame information is added.

12. The image processing method according to claim 11, wherein the reference frame is formed by a line.

13. The image processing method according to claim 11, further comprising a resolution converting step of converting an original image information into the image information so that a first resolution of an original image represented by the original image information is changed to a second resolution of an image represented by the image information.

14. An image processing method comprising:
an input step of inputting image information;
a reference frame detection step of detecting an reference frame in an image represented by the input image information, the reference frame being formed at a circumferential to the image;
a position detection step of detecting, in the image, a position where additional information is separated from the image information; and
an additional information separation step of separating the additional information from the image information at the detected position.

15. A computer readable medium storing a program for causing a computer to execute an image processing method comprising:
an input step of inputting image information;
a reference frame detection step of detecting an reference frame in an image represented by the input image information, the reference frame being formed at a circumferential to the image;
a position detection step of detecting, in the image, a position where additional information is separated from the image information; and
an additional information separation step of separating the additional information from the image information at the detected position.

16. An image processing apparatus for embedding additional information into image information, the image processing apparatus comprising:
additional information embedding means for embedding the additional information into the image information to produce integrated information which represents an information-embedded image in which the additional information is embedded at a position;
frame adding means for adding frame information to the integrated information, the frame information representing a reference frame peripheral to the information-embedded image, and the reference frame being used to detect, in the information-embedded image, the position at which the additional information is embedded; and
printing means for printing, on a printing medium, the information-embedded image with the reference frame based on the integrated information to which the frame information is added.

17. A computer readable medium storing a program for causing a computer to execute an image processing method for embedding additional information into image information, the image processing method comprising:
an additional information embedding step of embedding the additional information into the image information to produce integrated information which represents an information-embedded image in which the additional information is embedded at a position;
a frame adding step of adding frame information to the integrated information, the frame information representing a reference frame peripheral to the information-embedded image, and the reference frame being used to detect, in the information-embedded image, the position at which the additional information is embedded; and
a printing step of printing, on a printing medium, the information-embedded image with the reference frame based on the integrated information to which the frame information is added.

* * * * *